United States Patent
Mohamed et al.

(10) Patent No.: US 12,509,784 B2
(45) Date of Patent: Dec. 30, 2025

(54) METHOD FOR GENERATING HYDROGEN GAS

(71) Applicant: KING FAHD UNIVERSITY OF PETROLEUM AND MINERALS, Dhahran (SA)

(72) Inventors: Mohamed Jaffer Sadiq Mohamed, Dhahran (SA); Muhammad Ashraf Gondal, Dhahran (SA); Muhammad Hassan, Dhahran (SA); Abdul Zeeshan Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 468 days.

(21) Appl. No.: 18/331,227

(22) Filed: Jun. 8, 2023

(65) Prior Publication Data

US 2024/0410067 A1   Dec. 12, 2024

(51) Int. Cl.
*C25B 11/091* (2021.01)
*C25B 1/04* (2021.01)
(Continued)

(52) U.S. Cl.
CPC ............. *C25B 11/091* (2021.01); *C25B 1/04* (2013.01); *C25B 1/50* (2021.01); *C25B 9/50* (2021.01); *C25B 11/037* (2021.01); *C25B 11/087* (2021.01)

(58) Field of Classification Search
CPC  C25B 11/037; C25B 1/50; C25B 1/04; C25B 11/091
See application file for complete search history.

(56) References Cited

U.S. PATENT DOCUMENTS

| | | |
|---|---|---|
| 2005/0189014 A1 | 9/2005 | Gaudiana et al. |
| 2013/0248349 A1 | 9/2013 | Mul et al. |

(Continued)

FOREIGN PATENT DOCUMENTS

| | | |
|---|---|---|
| CN | 107442098 A | 12/2017 |
| EP | 1 188 711 A1 | 3/2002 |

(Continued)

OTHER PUBLICATIONS

Jishu Han, et al., "Synthesis of CdSe/SrTiO$_3$ nanocomposites with enhanced photocatalytic hydrogen production activity", Applied Surface Science, vol. 467-468, Feb. 15, 2019, pp. 1033-1039 (Abstract only).

(Continued)

*Primary Examiner* — Brian W Cohen
(74) *Attorney, Agent, or Firm* — Oblon, McClelland, Maier & Neustadt, L.L.P.

(57) ABSTRACT

A method of generating hydrogen gas including applying a potential of greater than 0 to 1.0 volts (V) to an electrochemical cell. The electrochemical cell is at least partially submerged in an aqueous solution. On applying the potential the aqueous solution is reduced thereby forming hydrogen gas. The electrochemical cell includes an electrocatalyst and a counter electrode. The electrocatalyst includes a substrate, strontium titanate (SrTiO$_3$) nanoparticles, and cadmium selenide (CdSe) nanoparticles. The SrTiO$_3$ nanoparticles have a substantially spherical shape. The CdSe nanoparticles have a polygon shape. The CdSe nanoparticles are distributed within a network of the SrTiO$_3$ nanoparticles on the surface of the substrate.

18 Claims, 27 Drawing Sheets

(51) Int. Cl.
  *C25B 1/50*    (2021.01)
  *C25B 9/50*    (2021.01)
  *C25B 11/037*  (2021.01)
  *C25B 11/087*  (2021.01)

(56) References Cited

U.S. PATENT DOCUMENTS

2014/0261645 A1* 9/2014 Hoertz .................. C25B 11/031
                                                      204/290.01
2016/0024664 A1* 1/2016 Krauss ..................... C25B 1/02
                                                      422/186.04

FOREIGN PATENT DOCUMENTS

WO    WO 2014/169373 A1    10/2014
WO    WO-2019021189 A1 *   1/2019    ............ B01J 21/063

OTHER PUBLICATIONS

Gosipathala Sreedhar, et al., "Enhanced Photoelectrochemical Performance of CdSe Quantum Dots Sensitized $SrTiO_3$", Journal of Materials Chemistry A, vol. 3, Issue 25, May 18, 2015, pp. 13476-13482.

Xing-Liang Yin, et al., "Room temperature synthesis of $CdS/SrTiO_3$ nanodots-on-nanocubes for efficient photocatalytic $H_2$ evolution from water", Journal of Colloid and Interface Science, vol. 536, Feb. 15, 2019, pp. 694-700 (Abstract only).

M.J.S. Mohamed, et al., "Exceptional co-catalysts free $SrTiO_3$ perovskite coupled CdSe nanohybrid catalyst by green pulsed laser ablation for electrochemical hydrogen evolution reaction", Chemical Engineering Journal Advances, vol. 11, 2022, pp. 1-10.

* cited by examiner

METHOD FOR GENERATING HYDROGEN GAS

STATEMENT OF PRIOR DISCLOSURE BY INVENTOR

Aspects of the present disclosure are described in M. J. S. Mohamed, M. A. Gondal, M. Hassan, A. Z. Khan, A. M. Surrati, M. A. Almessiere, "Exceptional co-catalysts free $SrTiO_3$ perovskite coupled CdSe nanohybrid catalyst by green pulsed laser ablation for electrochemical hydrogen evolution reaction" Jun. 16, 2022; 11, 100344, incorporated herein by reference in its entirety.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to an electrocatalyst, and particularly to a method of generating hydrogen gas using an electrocatalyst including strontium titanate ($SrTiO_3$) and cadmium selenide (CdSe) nanoparticles.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Photoelectrochemical (PEC) water splitting is considered as a solution to generate hydrogen gas using renewable energy sources such as water and sunlight. The electrocatalytic water splitting process is inherently sensitive to the capacity of the electrocatalyst, and hence the energy conversion efficiency of the process is mainly dependent on the type of catalyst used. In principle, semiconductor photoelectrodes capture sunlight photons to generate photoexcitons, i.e., electrons ($e^-$) and holes ($h^+$) in their conduction (CB) and valence bands (VB), respectively. The photoexcitons having an adequate energy initiate redox reactions and split water into $H_2$ and $O_2$ gases. Generally, electrochemical water splitting includes two steps: oxygen evolution reaction (OER) at the anode and hydrogen evolution reaction (HER) at the cathode. This process is limited on a large scale mainly due to the high cost, low abundance, and instability of the catalysts. Platinum (Pt) is considered one of the best electrocatalysts for HER, but it is expensive and scarce. Therefore, development of low-cost, abundant, and effective electrocatalytic systems has been explored.

Transition metal oxides, sulfides, and selenides have been studied as HER catalysts in pure and composite forms. In addition, inorganic perovskite materials of the form of $ABO_3$ (where A=alkaline earth metal, and B=transition metal) have gained considerable attention due to their promising electrochemical features. Strontium titanate ($SrTiO_3$) is a wide bandgap n-type material but is limited by its low conductivity and poor charge transfer kinetics. Modification of $SrTiO_3$ with other metals or metal chalcogenides can change the crystal structure of $SrTiO_3$ by adjusting the electronic structure, generating oxygen vacancies, and offering more catalytic sites. However, further research is needed to lower the cost of the catalytic system and to improve the catalytic performance.

Further, the method of making the catalysts limits their incorporation on a large scale due to cost, purity, reproducibility, etc. Numerous conventional synthesis methods, including wet-impregnation method, hydrothermal method, solvothermal method, chemical vapor deposition, thermal evaporation, sol-gel, and spray pyrolysis, etc., have their limitations in terms of precursor solutions, by-products, special conditions of temperature and pressure, reaction time, purity of the final product, and toxicity. Hence, there still exists a need for a method that can overcome the limitations of the art.

In view of the forgoing, one objective of the present invention is to provide an electrocatalyst including strontium titanate ($SrTiO_3$) and cadmium selenide (CdSe) nanoparticles and a method for making the electrocatalyst. It is another object of the present disclosure to provide an electrocatalyst with a high activity for HER. It is another object of the present disclosure to provide an electrocatalyst with a cheap and efficient method of making.

SUMMARY

In an exemplary embodiment, a method of generating hydrogen gas is described. The method includes applying a potential of greater than 0 to 1.0 volts (V) to an electrochemical cell. The electrochemical cell is at least partially submerged in an aqueous solution. On applying the potential the aqueous solution is reduced thereby forming hydrogen gas. The electrochemical cell includes an electrocatalyst and a counter electrode. The electrocatalyst includes a substrate, strontium titanate ($SrTiO_3$) nanoparticles, and cadmium selenide (CdSe) nanoparticles. The $SrTiO_3$ nanoparticles have a substantially spherical shape. The CdSe nanoparticles have a polygon shape. The CdSe nanoparticles are distributed within a network of the $SrTiO_3$ nanoparticles on a surface of the substrate.

In some embodiments, the $SrTiO_3$ nanoparticles have an average diameter of 50-150 nanometers (nm).

In some embodiments, the CdSe nanoparticles have an average size of 500 nm to 5 micrometers ($\mu m$).

In some embodiments, the CdSe nanoparticles and the $SrTiO_3$ nanoparticles form a heterostructure.

In some embodiments, the electrocatalyst includes 0.1-10 wt. % CdSe nanoparticles relative to a total weight of the CdSe nanoparticles and the $SrTiO_3$ nanoparticles.

In some embodiments, the electrocatalyst includes 80-99.9 wt. % $SrTiO_3$ nanoparticles relative to a total weight of the CdSe nanoparticles and the $SrTiO_3$ nanoparticles.

In some embodiments, the electrocatalyst includes 35-55 wt. % Sr, 20-30 wt. % Ti, 20-30 wt. % O, 0.1-5.0 wt. % Cd, and 0.01-2 wt. % Se, based on a total weight of the CdSe nanoparticles and the $SrTiO_3$ nanoparticles.

In some embodiments, the method further includes a method of making the electrocatalyst. The method includes sonicating a solution of $SrTiO_3$ and CdSe to form a homogeneous solution. The method includes irradiating the homogeneous solution with a pulsed laser for at least 10 minutes to form the CdSe nanoparticles and the $SrTiO_3$ nanoparticles in a suspension. The method includes drying the suspension at a temperature of at least 80° C. for at least 30 minutes and coating it on the substrate to form the electrocatalyst.

In some embodiments, the pulsed laser has a wavelength of 500-550 nm.

In some embodiments, the pulsed laser has a pulse duration of 5-10 nanoseconds (ns).

In some embodiments, the aqueous solution includes at least one base selected from the group consisting of an alkaline earth metal hydroxide and an alkali metal hydroxide.

In some embodiments, the base is potassium hydroxide.

In some embodiments, the substrate is made from a material selected from the group consisting of platinum, gold, and carbon.

In some embodiments, the electrocatalyst has an overpotential of 200-250 millivolts (mV) for a current density of 10 milliampere per square centimeter (mA cm$^{-2}$).

In some embodiments, the overpotential does not vary by more than 5% after the potential is applied for 2-50 hours.

In some embodiments, the electrocatalyst has a double layer capacitance of 300-350 microfarads per square centimeter (μF cm-2).

In some embodiments, the electrocatalyst has a double layer capacitance at least 2 times larger than a same electrocatalyst having only one of the CdSe nanoparticles and the SrTiO$_3$ nanoparticles.

In some embodiments, the electrocatalyst does not include a co-catalyst.

In some embodiments, the electrocatalyst includes the CdSe nanoparticles, the SrTiO$_3$ nanoparticles, and the substrate. The substrate is made of carbon.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
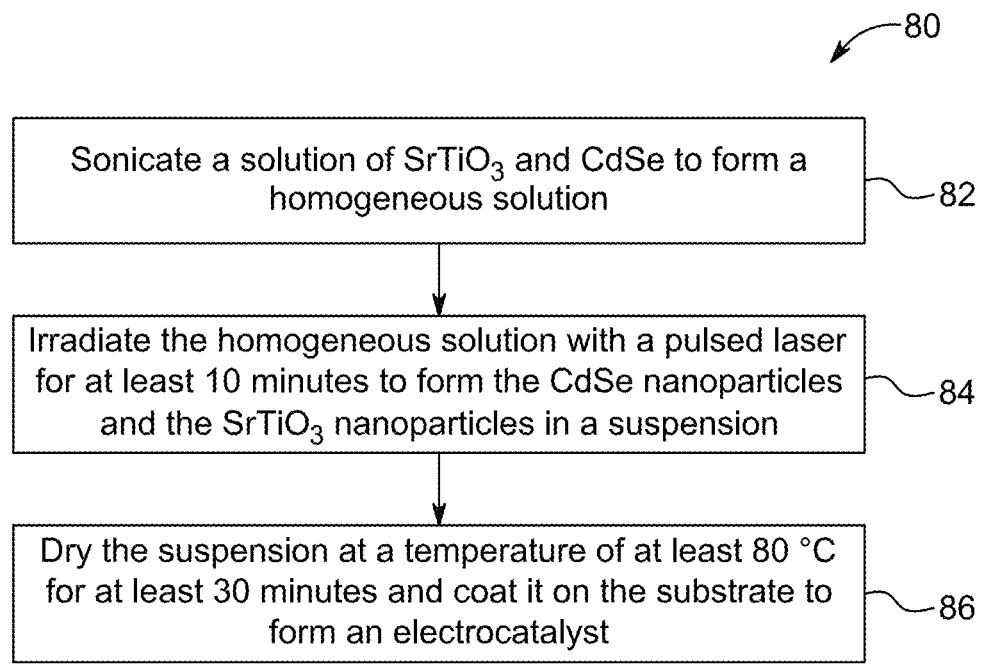
FIG. 1 is a schematic flow chart of a method of generating hydrogen gas, according to certain embodiments.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values there between.

Where a numerical limit or range is stated herein, the endpoints are included. Also, all values and subranges within a numerical limit or range are specifically included as if explicitly written out.

As used herein, 'working electrode' refers to the electrode in an electrochemical cell/device/sensor on which the electrochemical reaction of interest is occurring.

As used herein, 'counter-electrode', is an electrode used in an electrochemical cell for voltametric analysis or other reactions in which an electric current is expected to flow.

As used herein, the term 'glassy carbon' refers to a non-graphitizing carbon which combines glassy and ceramic properties with those of graphite.

As used herein, the term 'electrochemical cell' refers to a device capable of either generating electrical energy from chemical reactions or using electrical energy to cause chemical reactions.

As used herein, the term 'water splitting' refers to the chemical reaction in which water is broken down into oxygen and hydrogen.

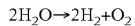

The present disclosure is intended to include all hydration states of a given compound or formula, unless otherwise noted or when heating a material.

Aspects of the present disclosure are directed to a method of generating hydrogen gas using an electrocatalyst including SrTiO$_3$ composited with CdSe made by a facile and clean method of pulsed laser ablation in liquid (PLAL).

According to an aspect of the present disclosure, an electrocatalyst is described. In some embodiments the electrocatalyst is used to generate hydrogen by splitting water. The electrocatalyst (otherwise referred to as the catalyst) includes cadmium selenide (CdSe) nanoparticles and strontium titanate (SrTiO$_3$) nanoparticles on a substrate. The substrate may be made from a material selected from the group consisting of platinum, gold, and carbon. In the preferred embodiment, the substrate is made of carbon. The carbon substrate may be a porous material. Also, pores of the carbon substrate may exist in many shapes, such as cubical, conical, cuboidal, pyramidical, or cylindrical. In a preferred embodiment, the substrate is made of glassy carbon.

In some embodiments, the electrocatalyst includes a co-catalyst. In an especially preferred embodiment, the electrocatalyst does not include a co-catalyst. As used herein, the term 'co-catalyst' refers to the substance or agent that brings about catalysis in conjunction with one or more others. In a more preferred embodiment, the co-catalyst does not include platinum. In the most preferred embodiment, the co-catalyst does not include any precious metals such as gold, silver, ruthenium, rhodium, palladium, osmium, iridium, and platinum. In a more preferred embodiment, the substrate and catalyst do not include platinum. In the most preferred embodiment, the substrate and catalyst do not include any precious metals such as gold, silver, ruthenium, rhodium, palladium, osmium, iridium, and platinum. In a preferred embodiment, the electrocatalyst consists of the CdSe nanoparticles, the SrTiO$_3$ nanoparticles, and the substrate.

The electrocatalyst includes 0.1-10 wt. %, preferably 0.5-9 wt. %, 1-8 wt. %, 2-7 wt. %, 3-6 wt. %, or 4-5 wt. % CdSe nanoparticles relative to the total weight of the CdSe nanoparticles and the SrTiO$_3$ nanoparticles. Furthermore, the electrocatalyst includes 90-99.9 wt. %, preferably 91-99.5 wt. %, 92-99 wt. %, 93-98 wt. %, 94-97 wt. %, or 95-96 wt. % SrTiO$_3$ nanoparticles relative to the total weight of the CdSe nanoparticles and the SrTiO$_3$ nanoparticles.

The electrocatalyst includes 35-55 wt. %, more preferably 40-45 wt. %, and yet more preferably 43.4 wt. % Sr; 20-30 wt. %, more preferably 25-30 wt. %, and yet more preferably 27.2 wt. % Ti, 20-30 wt. %, more preferably 25-28 wt. %, and yet more preferably 26.8 wt. % O, 0.1-5.0 wt. %, more preferably 0.5-4.0 wt. %, and yet more preferably 1-3 wt. % Cd, and 0.01-2 wt. %, more preferably 0.05-1.5 wt. %, and yet more preferably 0.7 wt. % Se, based on the total weight of the CdSe nanoparticles and the SrTiO$_3$ nanoparticles.

In some embodiments, a perovskite is included in the electrocatalyst. In some embodiments, the perovskite has a formula of ABO$_3$ (where A=alkaline earth metal, and B=transition metal). The alkaline earth metal (A) is selected from the group consisting of beryllium (Be), magnesium (Mg), calcium (Ca), strontium (Sr), barium (Ba), and radium (Ra). The transition metal (B) is selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), and mercury (Hg). In a preferred embodiment, the only perovskite included in the electrocatalyst is $SrTiO_3$.

In an embodiment, the $SrTiO_3$ nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In some embodiments, the $SrTiO_3$ nanoparticles are substantially spherical. In some embodiments, $SrTiO_3$ nanoparticles have an average diameter of 50-150 nanometers (nm), preferably 75-125 nm, or about 100 nm. In some embodiments, the $SrTiO_3$ nanoparticles are aggregated and form aggregates have a largest dimension of 500 to 1,000 nm, preferably 600-900 nm, or 700-800 nm.

In some embodiments, nanoparticles including transition metal oxides, sulfides, and selenides are included in the electrocatalyst. In an embodiment, the transition metal is selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), and mercury (Hg). In a preferred embodiment, the only transition metal oxide, sulfide, or selenide included in the electrocatalyst is CdSe.

In an embodiment, the CdSe nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. In some embodiments, the CdSe nanoparticles have a polygon shape. As referred to herein a polygon can be defined as a two-dimensional closed shape bounded with straight sides and does not have curved sides. In a preferred embodiment, the polygon shape has 4 sides and is a rectangle, square, or trapezoid. In some embodiments, a majority, at least 50%, 60%, 70%, 80%, 90%, or 100%, of the CdSe nanoparticles have a rectangular shape. In a preferred embodiment, less than 30%, preferably 20%, 10%, or 5% of the CdSe nanoparticles have a square or trapezoid shape, based on a total amount of the CdSe nanoparticles. In some embodiments, the CdSe nanoparticles have an average size of 500 nm to 5 micrometers (µm), preferably 1 to 4.5 µm, 2.5-4.0 µm, or 3.0-3.5 µm. The average size refers to an average of the longest dimension of the CdSe nanoparticles.

In some embodiments, the CdSe nanoparticles are distributed within a network of the $SrTiO_3$ nanoparticles on a surface of the substrate. In other words, the CdSe nanoparticles are intermixed with the $SrTiO_3$ nanoparticles in a matrix and are not divided into separate sides. In some embodiments, the CdSe nanoparticles and the $SrTiO_3$ nanoparticles are linked together. In some embodiments, the CdSe nanoparticles and the $SrTiO_3$ nanoparticles form a heterostructure. In some embodiments, the CdSe nanoparticles and $SrTiO_3$ nanoparticles retain their shape when incorporated together in the electrocatalyst.

In an embodiment, the substrate is deposited partially or wholly with at least one layer of the $SrTiO_3$ and CdSe nanoparticles in a uniform and continuous manner. In an embodiment, the $SrTiO_3$ and CdSe nanoparticles cover at least 50%, 60%, 70%, 80%, 90%, or 100%, or a surface area of the substrate surface. In a preferred embodiment, the $SrTiO_3$ and CdSe nanoparticles form a continuous layer on the substrate. In an embodiment, particles of the $SrTiO_3$ and CdSe nanoparticles form a monolayer on the substrate. In another embodiment, the $SrTiO_3$ and CdSe nanoparticles may form more than a single layer on the substrate.

FIG. 1 illustrates a flow chart of a method 80 of making the electrocatalyst. The order in which the method 80 is described is not intended to be construed as a limitation, and any number of the described method steps can be combined in any order to implement the method 80. Additionally, individual steps may be removed or skipped from the method 80 without departing from the spirit and scope of the present disclosure. One of ordinary skill in the art would recognize that this method could be modified to produce an electrocatalyst with other nanoparticles.

At step 82, the method 80 includes sonicating a solution of $SrTiO_3$ and CdSe to form a homogeneous solution. The sonication can be performed ultrasonically (using a sonication bath or sonication probe) for a time range of 25 to 35 minutes, more preferably 27 to 32 minutes, and yet more preferably 30 minutes. As used herein, the term 'sonication' refers to the process in which sound waves are used to agitate particles in a solution. In some embodiments, other modes of agitation known to those of ordinary skill in the art, for example, via stirring, swirling, mixing, or a combination thereof may be employed to form the resultant mixture.

At step 84, the method 80 includes irradiating the homogeneous solution with a pulsed laser for at least 10 minutes to form the CdSe nanoparticles and the $SrTiO_3$ nanoparticles in a suspension. PLAL is a facile, one-step and clean method which follows a top-down approach to synthesize nanomaterials and their composites with ultra-high purity. PLAL approach is environmentally friendly and does not require any special conditions of temperature and pressure. The resultant suspension doesn't need any post-synthesis purification because there are no intermediary chemicals or catalysts used in the PLAL process thereby yielding a highly pure nanocomposite material.

The pulsed laser has a wavelength of 500-550 nm, more preferably 525-535 nm, and yet more preferably 532 nm.

Figure 17:
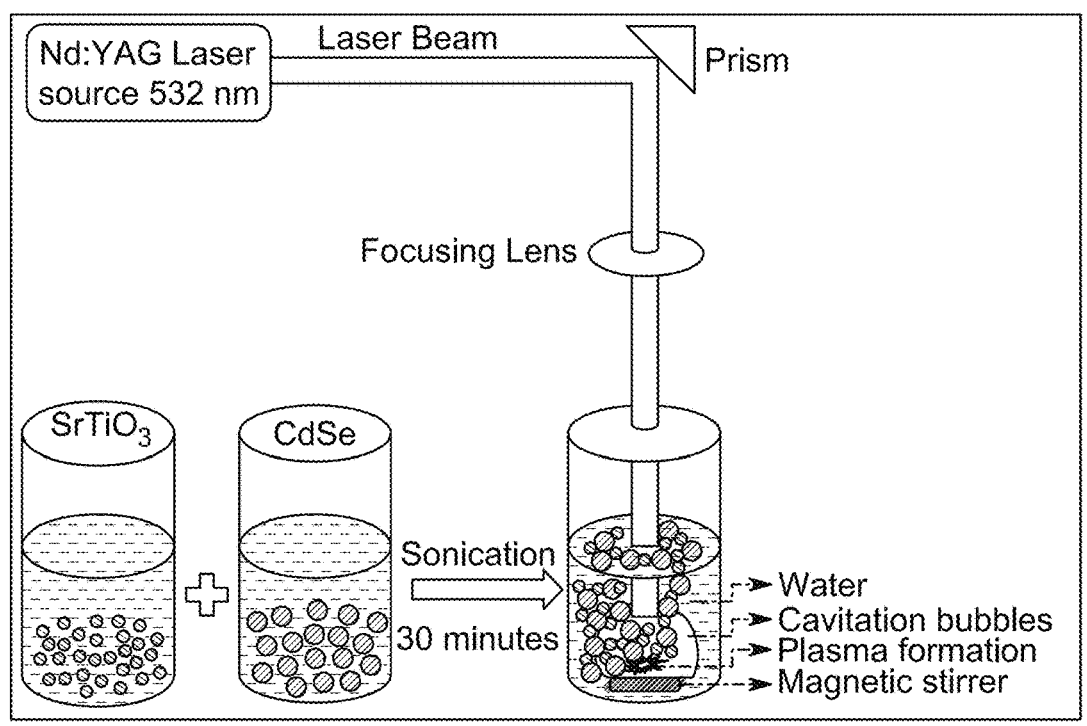
FIG. 17 depicts a schematic representation of a pulsed laser ablation in liquid (PLAL) method, according to certain embodiments.

The pulsed laser has a pulse duration of 5-10 nanoseconds (ns), more preferably 7-9 nm, and yet more preferably 8 ns. FIG. 17 depicts an embodiment of a PLAL method.

At step 86, the method 80 includes drying the suspension at a temperature of at least 80° C., preferably 80-150° C., preferably 100-120° C. for at least 30 minutes, preferably 30 minutes to 10 hours, more preferably 1-3 hours and coating it on the substrate to form the electrocatalyst. The drying can be done by using heating appliances such as ovens, microwaves, autoclaves, hot plates, heating mantles and tapes, oil baths, salt baths, sand baths, air baths, hot-tube furnaces, and hot-air guns. In an embodiment, the coating is done by drop casting, spin coating or with an automatic coating machine.

In a preferred embodiment, the $SrTiO_3$ and CdSe nanoparticles are made in a same solution, i.e., the homogeneous solution includes both $SrTiO_3$ and CdSe. In another embodiment, the $SrTiO_3$ and CdSe nanoparticles are made separately, i.e. the homogenous solution includes only $SrTiO_3$ or CdSe and then they are mixed together before being deposited on the substrate.

In some embodiment, the produced electrocatalyst is included in an electrochemical cell for water splitting. The electrochemical cell includes an electrocatalyst and a counter electrode. In some embodiments, a method of generating hydrogen gas is described. The method includes applying a potential of greater than 0 to 1.0 volts (V) to an electrochemical cell, preferably 0.1 to 0.9 V, 0.2 to 0.8 V, 0.3 to 0.7 V, or 0.4 to 0.6 V. The electrochemical cell is at least partially submerged in an aqueous solution, preferably at least 50%, 60%, 70%, 80%, 90%, or fully submerged in the aqueous solution.

The electrochemical cell includes an electrocatalyst and a counter electrode. The electrocatalyst may form the working electrode, while the counter electrode may form the auxiliary electrode. The outer surface of the counter electrode may include an inert, electrically conducting chemical substance, such as platinum, gold, or carbon. The carbon may be in the form of graphite or glassy carbon. In one embodiment, the counter electrode may be a wire, a rod, a cylinder, a tube, a scroll, a sheet, a piece of foil, a woven mesh, a perforated sheet, or a brush. The counter electrode material should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or lead to undesirable contamination of either electrode.

In some embodiments, the working electrode and the counter-electrode may be connected to each other by way of electrical interconnects that allow for the passage of current between the electrodes, when a potential is applied between them. In a preferred embodiment, the electrocatalyst (which forms the working electrode) and the counter electrode may be at least partially submerged in the aqueous solution and are not in physical contact with each other. In an embodiment, the working electrode and the counter-electrode may have the same or different dimensions. The working electrode and the counter-electrode may be arranged as obvious to a person of ordinary skill in the art. In some embodiments, the electrochemical cell further includes a reference electrode. In some embodiments, the reference electrode is selected from the group consisting of a standard hydrogen electrode (SHE), a calomel electrode, a silver-silver chloride electrode and a glass electrode.

In some embodiments, the aqueous solution includes water and an inorganic base. The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 25° C. has a conductivity at less than 10 micro siemens per centimeter ($\mu S \cdot cm^{-1}$), preferably less than 1 $\mu S \cdot cm^{-1}$, a resistivity greater than 0.1 megaohms-cm (M$\Omega$-cm), preferably greater than 1 M$\Omega$-cm, more preferably greater than 10 M$\Omega$-cm, a total solid concentration less than 5 milligrams per kilogram (mg/kg), preferably less than 1 mg/kg, and a total organic carbon concentration less than 1000 microgram per liter ($\mu$g/L), preferably less than 200 $\mu$g/L, more preferably less than 50 $\mu$g/L.

The aqueous solution includes at least one base selected from the group consisting of an alkaline earth metal hydroxide and an alkali metal hydroxide. The base may be selected from the group consisting of an alkaline earth metal hydroxide such as beryllium hydroxide ($Be(OH)_2$), magnesium hydroxide ($Mg(OH)_2$), strontium hydroxide ($Sr(OH)_2$), and calcium hydroxide ($Ca(OH)_2$) and an alkali metal hydroxide such as lithium hydroxide (LiOH), sodium hydroxide (NaOH), potassium hydroxide (KOH) and rubidium hydroxide (RbOH), and cesium hydroxide (CsOH). In a preferred embodiment, the base is potassium hydroxide.

On applying the potential, the aqueous solution is reduced thereby forming hydrogen gas. The electrocatalyst has an overpotential of 200-250 mV, preferably 210-240 mV, or 220-230 mV for a current density of 10 mA cm-2. The overpotential does not vary by more than 5%, preferably 4%, 3%, 2%, or 1% after the potential is applied for 2-50 hours. As used herein, the term 'overpotential' is referred to as the difference between the equilibrium potential for a given reaction (also called the thermodynamic potential) and the potential at which a catalyst operates at a specific current under specific conditions. In other words, for the present electrocatalyst a potential of only 200-250 mV is needed to achieve a current density of 10 mA cm$^{-2}$. Whereas the $SrTiO_3$ and CdSe nanoparticles alone separately require an overpotential of 375-400 mV to achieve a current density of 10 mA cm$^{-2}$.

The electrocatalyst has a double-layer capacitance of 300-350, preferably 310-340, or 320-330 microfarads per square centimeter ($\mu F\ cm^{-2}$). Whereas the $SrTiO_3$ and CdSe nanoparticles alone have a double-layer capacitance of about 67 $\mu F\ cm^{-2}$ and 145 $\mu F\ cm^{-2}$, respectively. In some embodiments, the electrocatalyst has a double layer capacitance at least 2, preferably 3, 4, or 5 times larger than a same electrocatalyst having only one of the CdSe nanoparticles and the $SrTiO_3$ nanoparticles. Double-layer capacitance is a characteristic of an electrical double layer which appears at an interface between a surface and a fluid (for example, between a conductive electrode and an adjacent liquid electrolyte).

While not wishing to be bound to a single theory, it is thought that the heterostructure formed by the PLAL synthesis method between the $SrTiO_3$ and CdSe nanoparticles offers more efficient ion and electron transfer/diffusion channels. The incorporation of CdSe into $SrTiO_3$ improves the nanohybrid's electrocatalytic HER performance by increasing the electrochemical surface area and the number of active sites, hence facilitating the electron transfer at a semiconductor-electrolyte interface. Further, the uniform and continuous spherical morphology of the $SrTiO_3$ nanoparticles provides many active catalytic centers, thus boosting the electrocatalyst's performance. The synergistic relationship between the $SrTiO_3$ and CdSe nanoparticles together in the heterostructure thereby result in a higher performing electrocatalyst compared to the two materials alone.

The electrocatalyst of the present disclosure may also be used in water-splitting reactions. In some embodiments, the electrocatalyst may also be used in the field of batteries, fuel cells, photochemical cells, water splitting cells, electronics, water purification, hydrogen sensors, semiconductors (such as field-effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

EXAMPLES

The following examples describe and demonstrate exemplary embodiments of the method of generating hydrogen gas described herein. The examples are provided solely for the purpose of illustration and are not to be construed as limitations of the present disclosure, as many variations thereof are possible without departing from the spirit and scope of the present disclosure.

Example 1: Chemicals

Strontium titanate ($SrTiO_3$), cadmium selenide (CdSe), potassium hydroxide (KOH), and 5 wt. % Nafion solution are the chemicals purchased from Sigma Aldrich and used without any further treatment.

Example 2: Synthesis

Pulsed laser ablation in liquid (PLAL) was used to synthesize $SrTiO_3$/CdSe-(x) (x=1.0, 2.0, 3.0, and 4.0%) composites. To synthesize $SrTiO_3$+CdSe—1, 10 milligrams (mg) of CdSe were mixed with 100 mg of $SrTiO_3$ in 25 milliliters (mL) of deionized water (DI) and ultrasonically homogenized (Ultrasonic homogenizer UZ SONOPULS HD 2070; 70 W and 20 kHz) for 30 min. The resulting combination ($SrTiO_3$+CdSe) was then irradiated with a Q-Switched Nd-YAG laser with a 532 nm wavelength and 8 ns pulse duration. The intensity of the laser beam was further enhanced by employing a focusing lens, and the irradiation period for each sample was set to 30 min under continuous stirring. The resulting suspension of the CdSe incorporated $SrTiO_3$ nanoparticles were dried at 120° C. for 2 h. The remaining $SrTiO_3$/CdSe samples with varying CdSe wt. % were synthesized using the same method. The synthesized $SrTiO_3$/CdSe-(x) that includes x with 0, 1, 2, 3, and 4 wt. % of CdSe is designated as $SrTiO_3$, $SrTiO_3$/CdSe-1, $SrTiO_3$/CdSe-2, $SrTiO_3$/CdSe-3, and $SrTiO_3$/CdSe-4, respectively. Collectively, they are referred to as the catalyst.

Example 3: Electrochemical Measurement Techniques

Electrochemical measurements of $SrTiO_3$, CdSe and their composites $SrTiO_3$/CdSe-(x) electrodes were performed in a computer-controlled AutoLab (Autolab PGSTAT302N Potentiostat) in a standard three-electrode cell configuration. Teflon™ made electrochemical cell contains a reference electrode of Ag/AgCl (3.0 molar (M) KCl solution), a counter electrode made of platinum (Pt), and a working electrode made of glassy carbon (GC) electrode modified with the catalyst are submerged in the aqueous solution of 0.1 M KOH as an electrolyte. The modified working electrode was prepared by combining 4 mg of the catalyst with 80 microliters (μL) of 5 wt. % Nafion solution in 1 mL of DI water and ethanol (4:1 v/v). For 30 min, ultrasonication was used to mix the solution to form a suspension properly. Then, 5 μL of the resultant suspension was dropped at the tip of the GC electrode and allowed to dry for 2 h at 60° C. The resulting mass loading of the catalyst was 0.285 milligrams per square centimeter ($mg/cm^2$) and was maintained constant for all other working electrodes. Linear sweep voltammetry (LSV) method was used with a scan rate of 5 millivolts per second (mV/s) in a KOH (0.1 M) solution with pH=13.0. The electrochemical impedance spectroscopy (EIS) measurements were performed at 10 mV of alternating current (AC) voltage amplitude with frequencies ranging from 0.1 hertz (Hz) to 105 Hz. The potential values have been adjusted in accordance with the reversible hydrogen electrode (RHE) by using Nernst Equation ($E_{RHE}=E_{applied}+0.0591 \times pH+E^0_{Ag/AgCl}$), where $E_{applied}$ and $E_{RHE}$ are applied potential against Ag/AgCl and reversible hydrogen electrode potential, respectively. The reference electrode potential is represented by $E^0_{Ag/AgCl}$ and equal to 0.198 V at 25° C.

Example 4: Characterization Techniques

X-ray diffractometer diffractometer (manufactured by Rigaku, 2601A, Tengda Plaza, No. 168, Xizhimenwai Ave) was used to perform X-ray diffraction (XRD) measurements, which used Cu Kα (λ=0.15406 nm) as an X-ray radiation source. The Raman analysis of the samples was carried out using a LabRAM HR Evolution Raman spectrometer (manufactured by HORIBA Scientific, 9755 Research Drive, Irvine, CA 92618, U.S.A) equipped with a He—Ne laser source. The 532 nm excitation wavelength with 10% of the power was used for the spectral measurement. The morphology of the materials, including their shape and size, was investigated by using scanning electron microscope (SEM) with energy dispersive X-ray analysis (EDX) (Zeiss Company), and transmission electron microscopy (TEM) (Titan-FEI-Morgagni-268, Hillsboro, Oregon). The Kratos DLD (Trafford Wharf Road Wharfside Manchester, M17 1GP United Kingdom), equipped with a monochromatic micro-focused Al Kα as X-ray source, was used for the X-ray photoelectron spectroscopy (XPS) studies.

Example 5: Characterization of the Electrodes

Figure 2A:
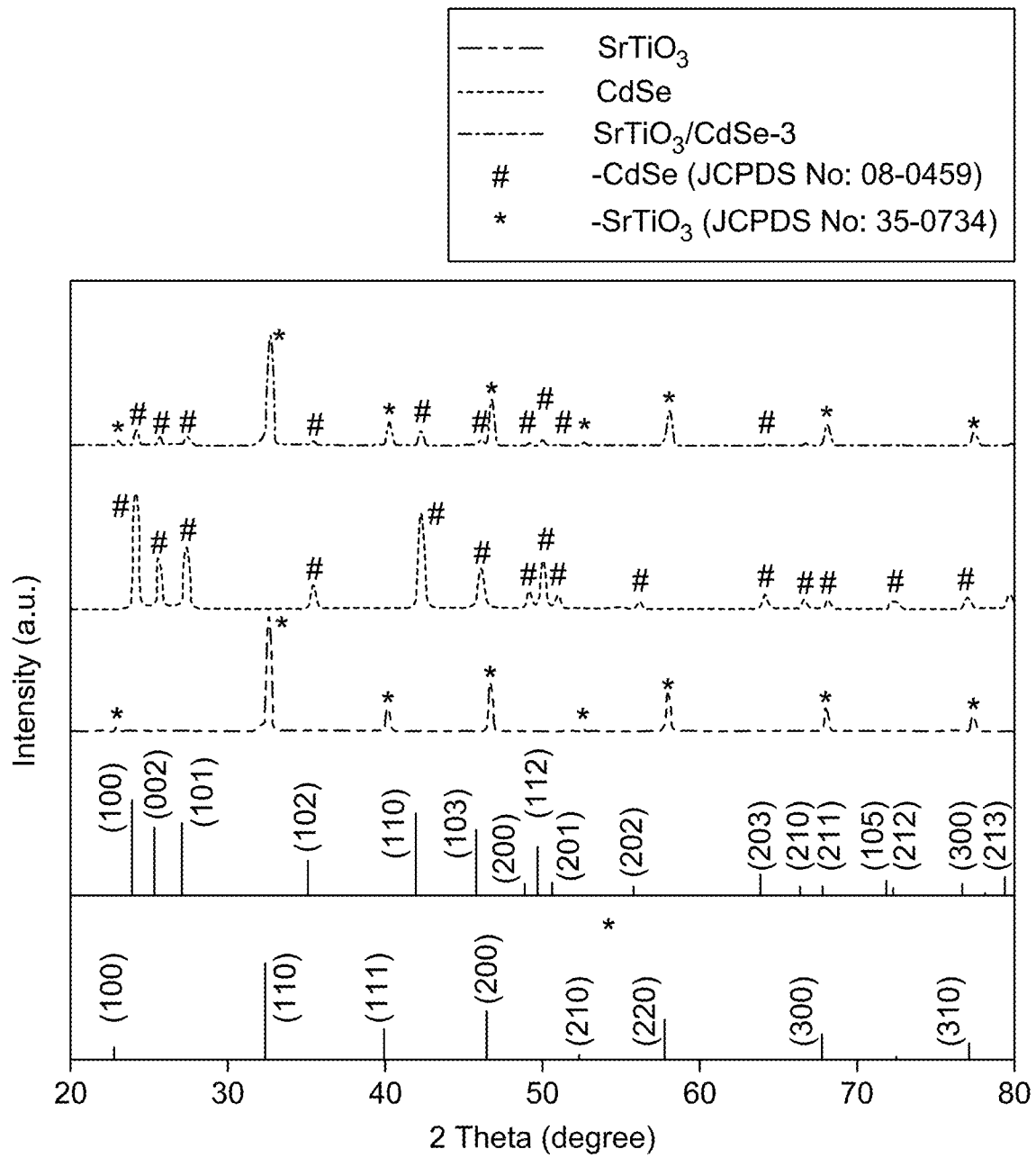
FIG. 2A depicts X-ray diffraction (XRD) diffraction spectra of SrTiO$_3$, CdSe, and SrTiO$_3$/CdSe-3 electrodes, according to certain embodiments.
Figure 2B:
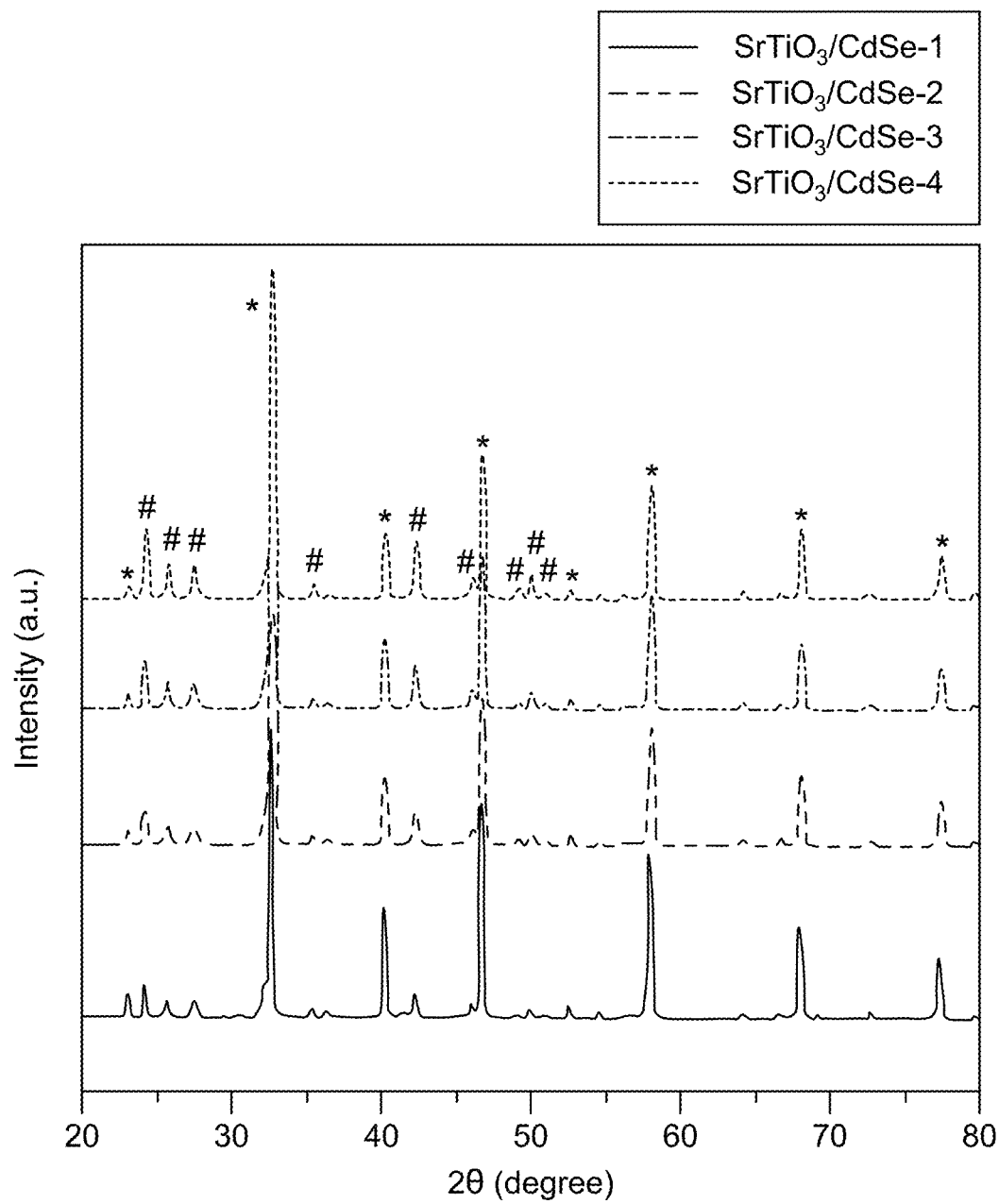
FIG. 2B depicts XRD diffraction spectra of SrTiO$_3$/CdSe electrodes, with varying percentage of CdSe, according to certain embodiments.

Structural information of bare $SrTiO_3$, CdSe, and composite $SrTiO_3$/CdSe electrodes was carried out by XRD, as depicted in FIG. 2A and FIG. 2B. The diffraction peaks represented by the star (*) symbol at 23.0°, 32.6°, 40.2°, 46.7°, 52.6°, 58.0°, 68.0°, and 77.4° were indexed to the (100), (110), (111), (200), (210), (211), (220), and (310) basal planes of $SrTiO_3$ (JCPDS No. 35-0734), respectively. The diffraction peaks represented by the hash (#) symbol at 24.1°, 25.6°, 27.3°, 35.3°, 42.3°, 46.0°, 49.0°, 49.9°, 50.5°, 56.0°, 64.1°, 66.6°, 68.1°, 72.0°, and 76.9° were indexed to the (100), (002), (101), (102), (110), (103), (200), (112), (201), (202), (203), (210), (211), (105), and (300) basal planes of CdSe (JCPDS No. 08-0459), respectively. Further, CdSe modification to the $SrTiO_3$ can also be confirmed and characterized by XRD. As shown in FIG. 2B, the peak intensities of CdSe are gradually enhanced with the CdSe content. The positions of characteristic diffraction peaks of $SrTiO_3$ in $SrTiO_3$/CdSe samples are not changed after the modification of CdSe, which indicates that the CdSe doesn't destroy the crystal structure of $SrTiO_3$ in all $SrTiO_3$/CdSe samples.

Figure 3:
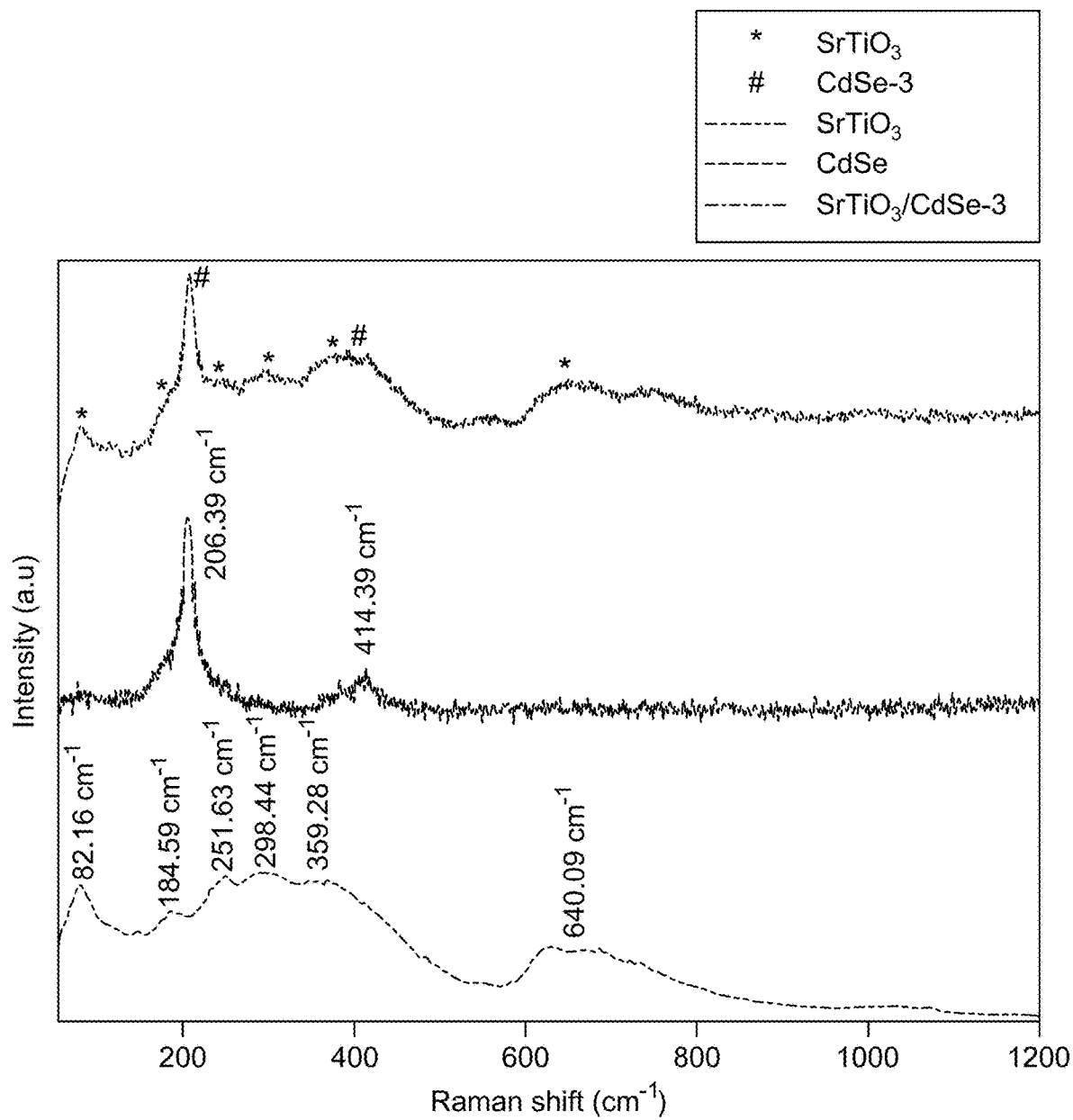
FIG. 3 depicts Raman spectra of SrTiO$_3$, CdSe, and SrTiO$_3$/CdSe-3 electrodes, according to certain embodiments.

The Raman spectra of CdSe, $SrTiO_3$, and $SrTiO_3$/CdSe-3 composite electrodes are illustrated in FIG. 3. The low-frequency band at 82.16 $cm^{-1}$ and other broadband regions centered at 184.59 $cm^{-1}$, 251.63 $cm^{-1}$, 298.44 $cm^{-1}$, 359.28 $cm^{-1}$, 640.09 $cm^{-1}$ are observed in the $SrTiO_3$/CdSe-3 electrode. Assigned peaks are in agreement with the $SrTiO_3$ sample, and these broad spectra are related to the second order of the Raman active mode of $SrTiO_3$. However, an intense longitudinal optical (LO) mode is observed at 206.39 $cm^{-1}$ related to the CdSe in the $SrTiO_3$/CdSe-3 electrode. Moreover, the peak at 414.39 $cm^{-1}$ is associated to the first overtone (2 LO) in CdSe sample.

Figure 4A:
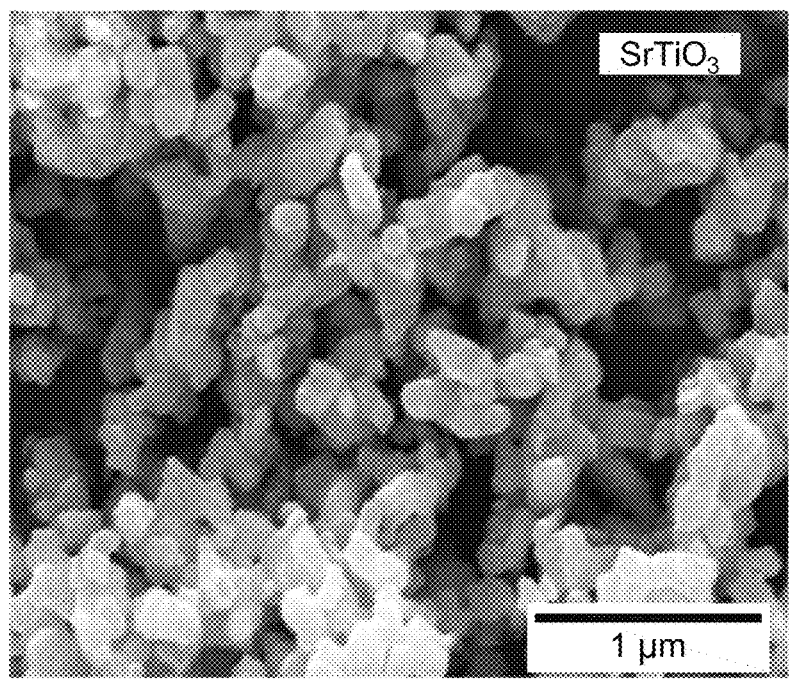
FIG. 4A depicts scanning electron microscopy (SEM) micrograph of the SrTiO$_3$ electrode, according to certain embodiments.
Figure 4B:
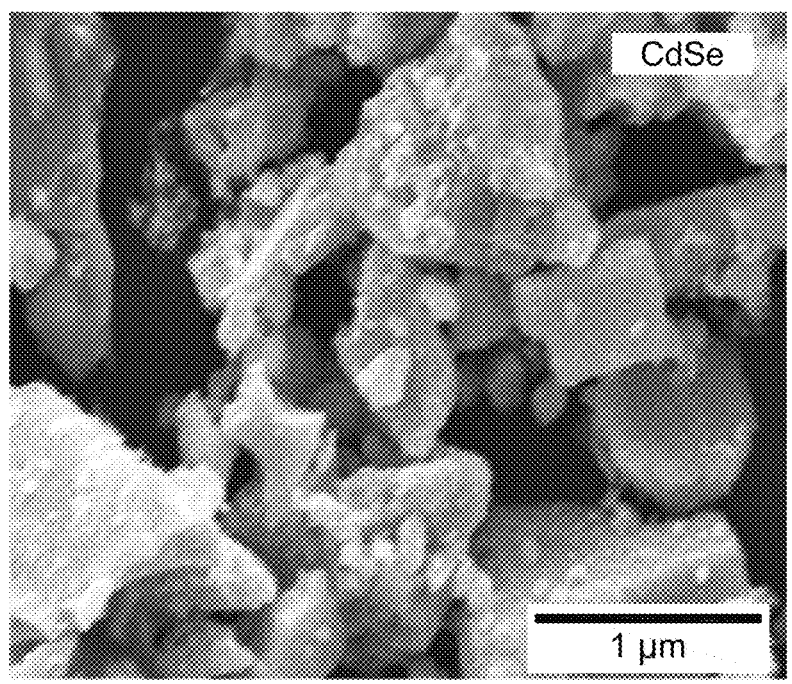
FIG. 4B depicts SEM micrograph of the CdSe electrode, according to certain embodiments.
Figure 4C:
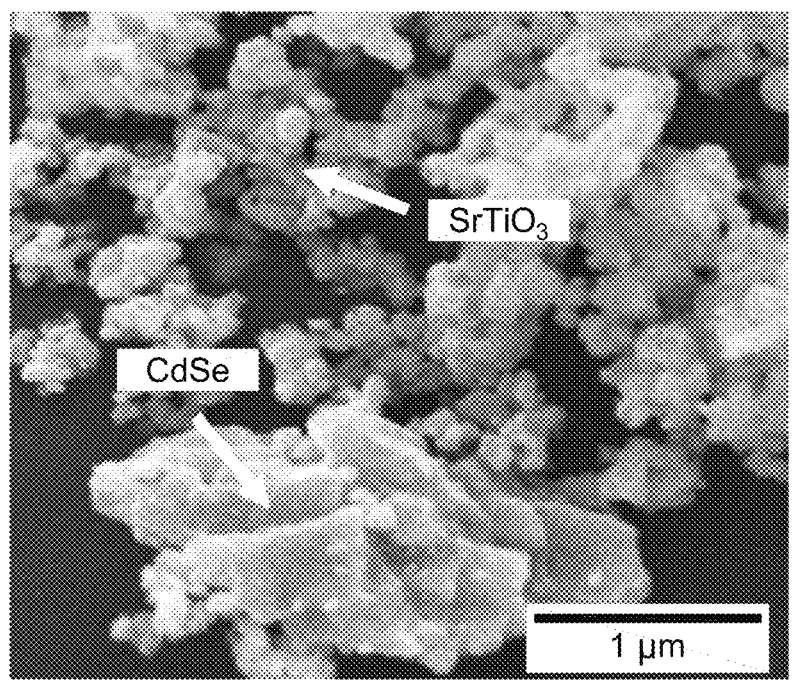
FIG. 4C depicts SEM micrograph of the SrTiO$_3$/CdSe-3 electrode, according to certain embodiments.
Figure 5A:
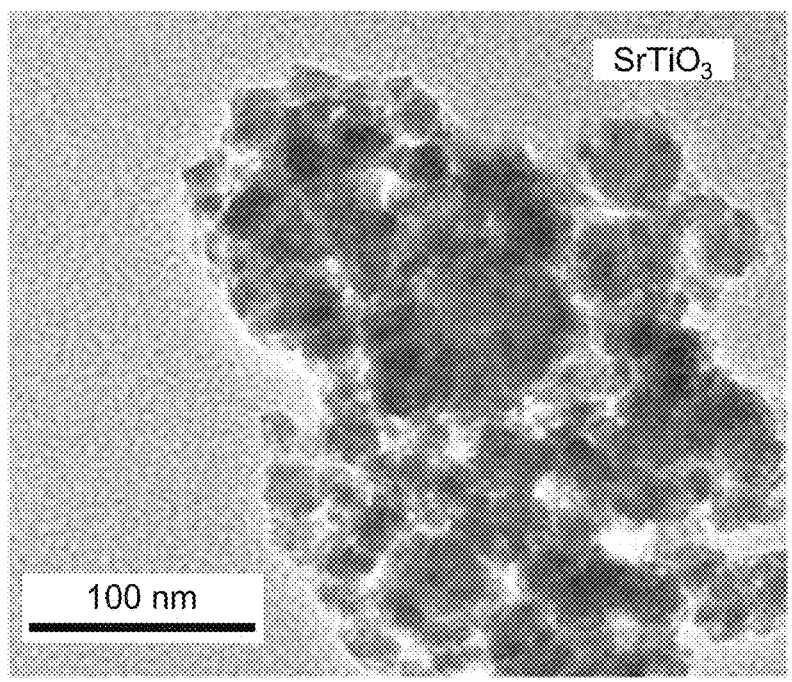
FIG. 5A depicts a transmission electron microscopy (TEM) image of the SrTiO$_3$ electrode, according to certain embodiments.
Figure 5B:
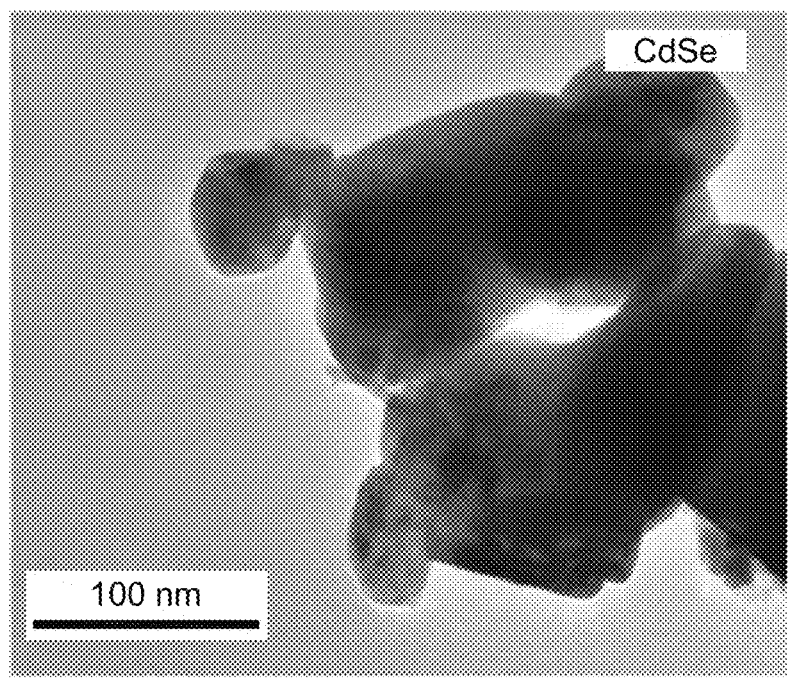
FIG. 5B depicts a TEM image of the CdSe electrode, according to certain embodiments.
Figure 5C:
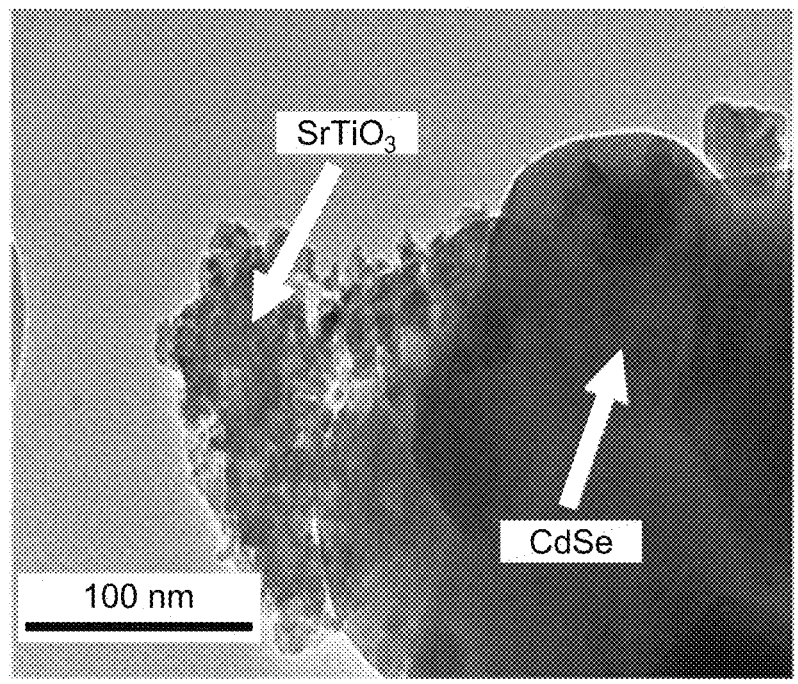
FIG. 5C depicts a TEM image of the SrTiO$_3$/CdSe-3 electrode, according to certain embodiments.
Figure 5D:
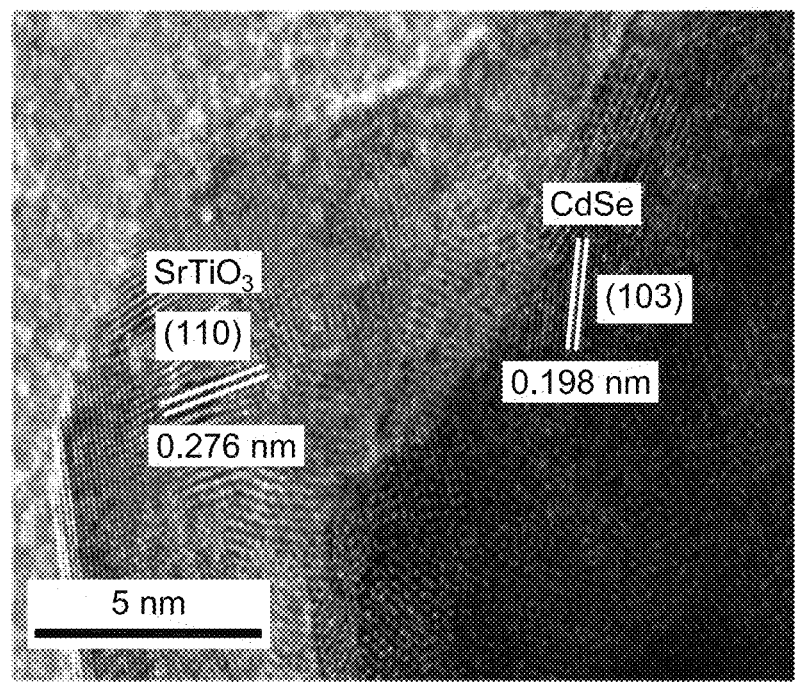
FIG. 5D depicts a high-resolution TEM image of the SrTiO$_3$/CdSe-3 electrode, according to certain embodiments.
Figure 6A:
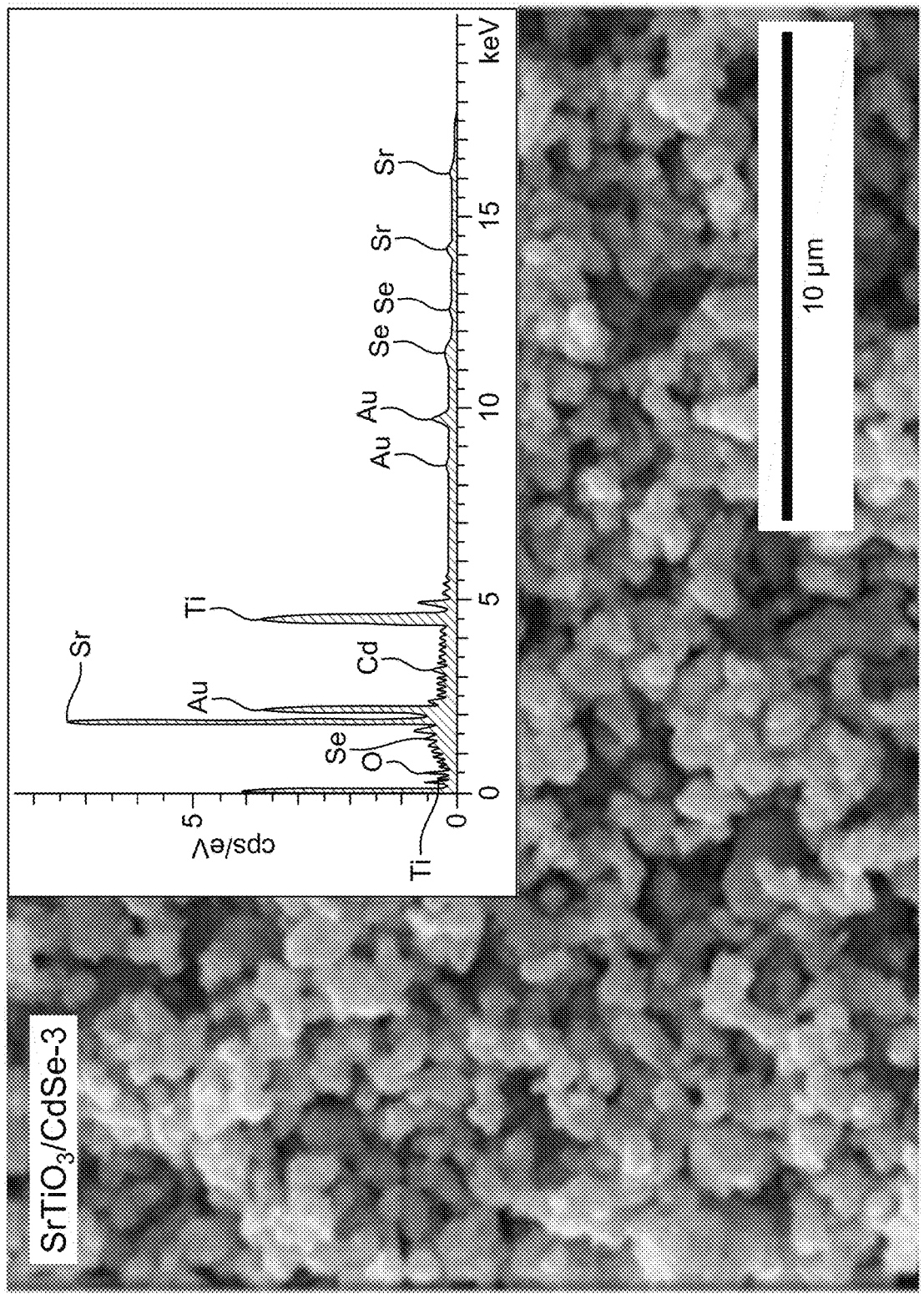
FIG. 6A depicts an energy dispersive x-ray analysis (EDX) spectrum of the SrTiO$_3$/CdSe-3 electrode, according to certain embodiments.
Figure 6B:
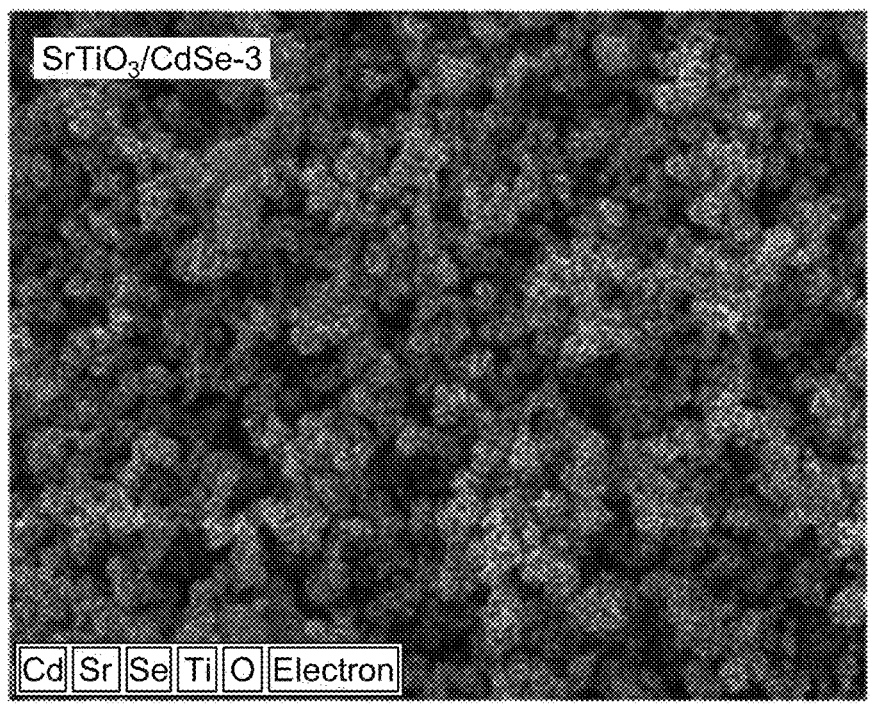
FIG. 6B depicts an elemental map of Sr, Ti, O, Cd, and Se in the SrTiO$_3$/CdSe-3 electrode, according to certain embodiments.
Figure 6C:
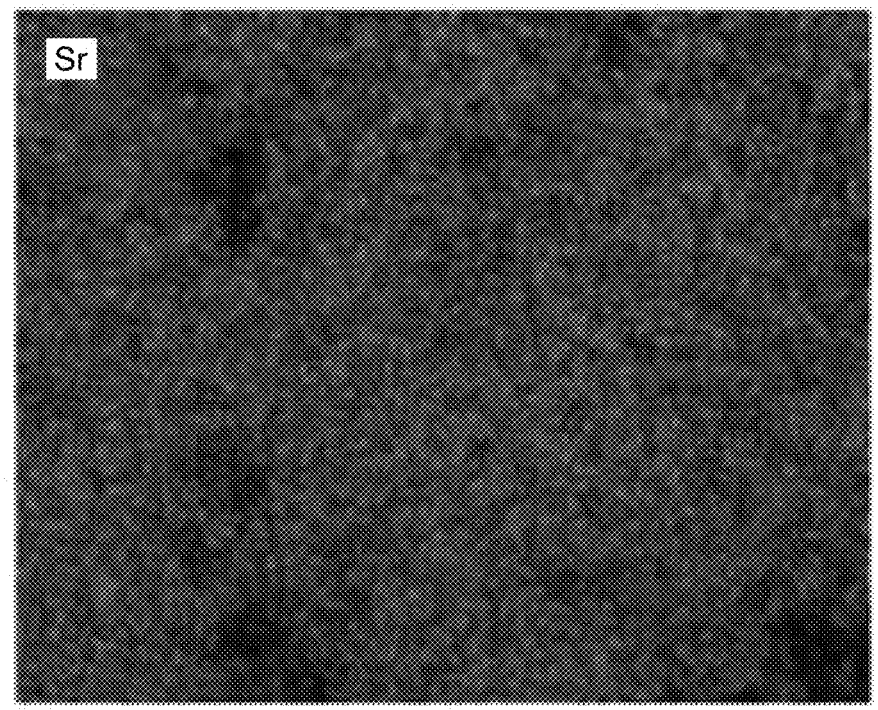
FIG. 6C depicts an elemental map of Sr in the SrTiO$_3$/CdSe-3 electrode, according to certain embodiments.
Figure 6D:
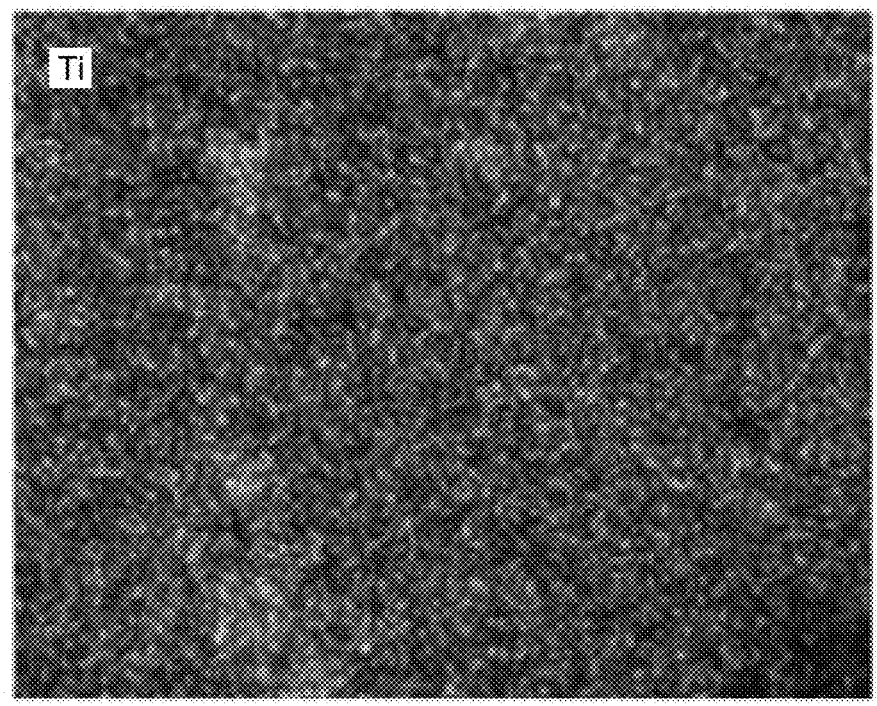
FIG. 6D depicts an elemental map of Ti in the SrTiO$_3$/CdSe-3 electrode, according to certain embodiments.
Figure 6E:
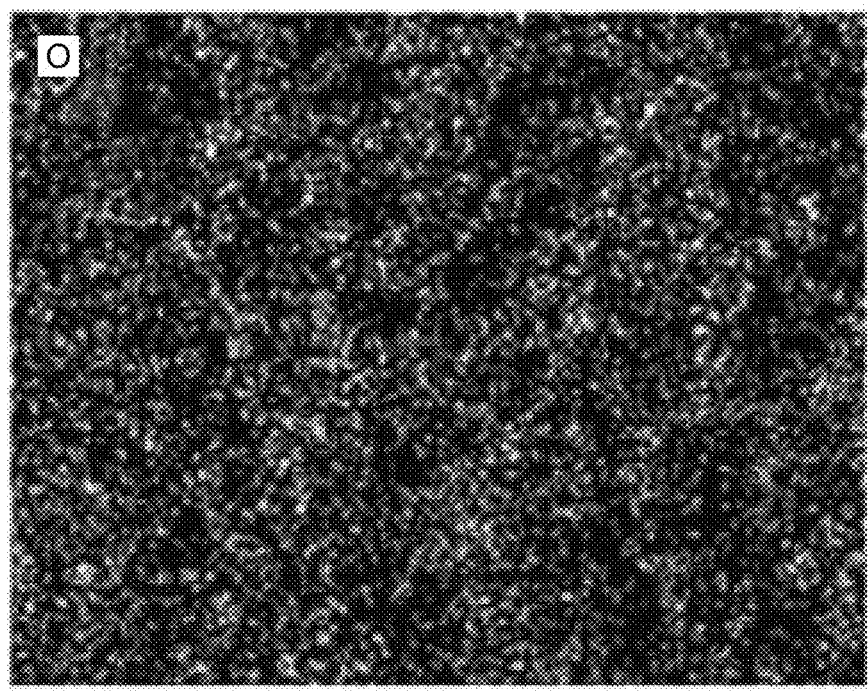
FIG. 6E depicts an elemental map of O in the SrTiO$_3$/CdSe-3 electrode, according to certain embodiments.
Figure 6F:
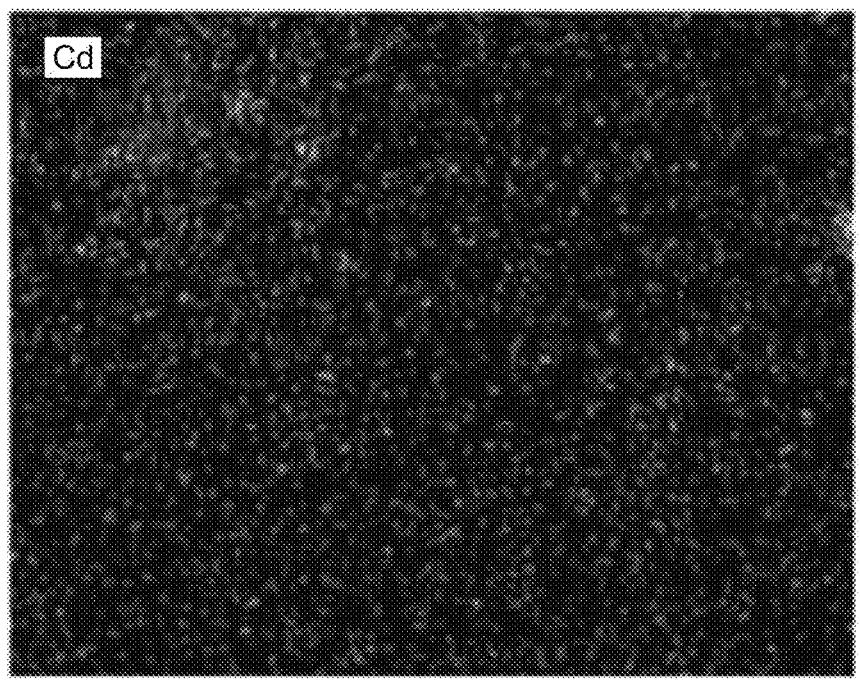
FIG. 6F depicts an elemental map of Cd in the SrTiO$_3$/CdSe-3 electrode, according to certain embodiments.
Figure 6G:
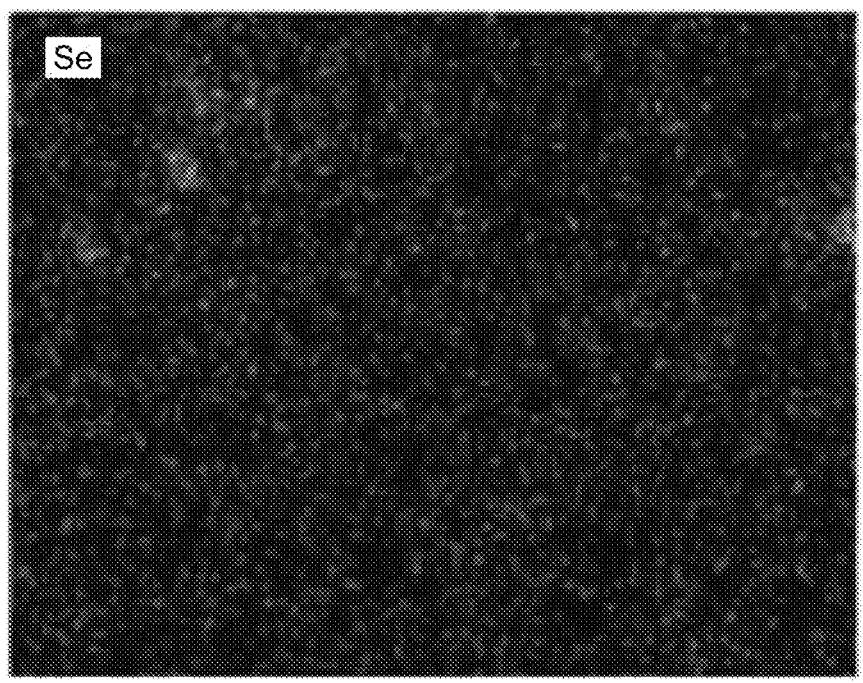
FIG. 6G depicts an elemental map of Se in the SrTiO$_3$/CdSe-3 electrode, according to certain embodiments.
Figure 7A:
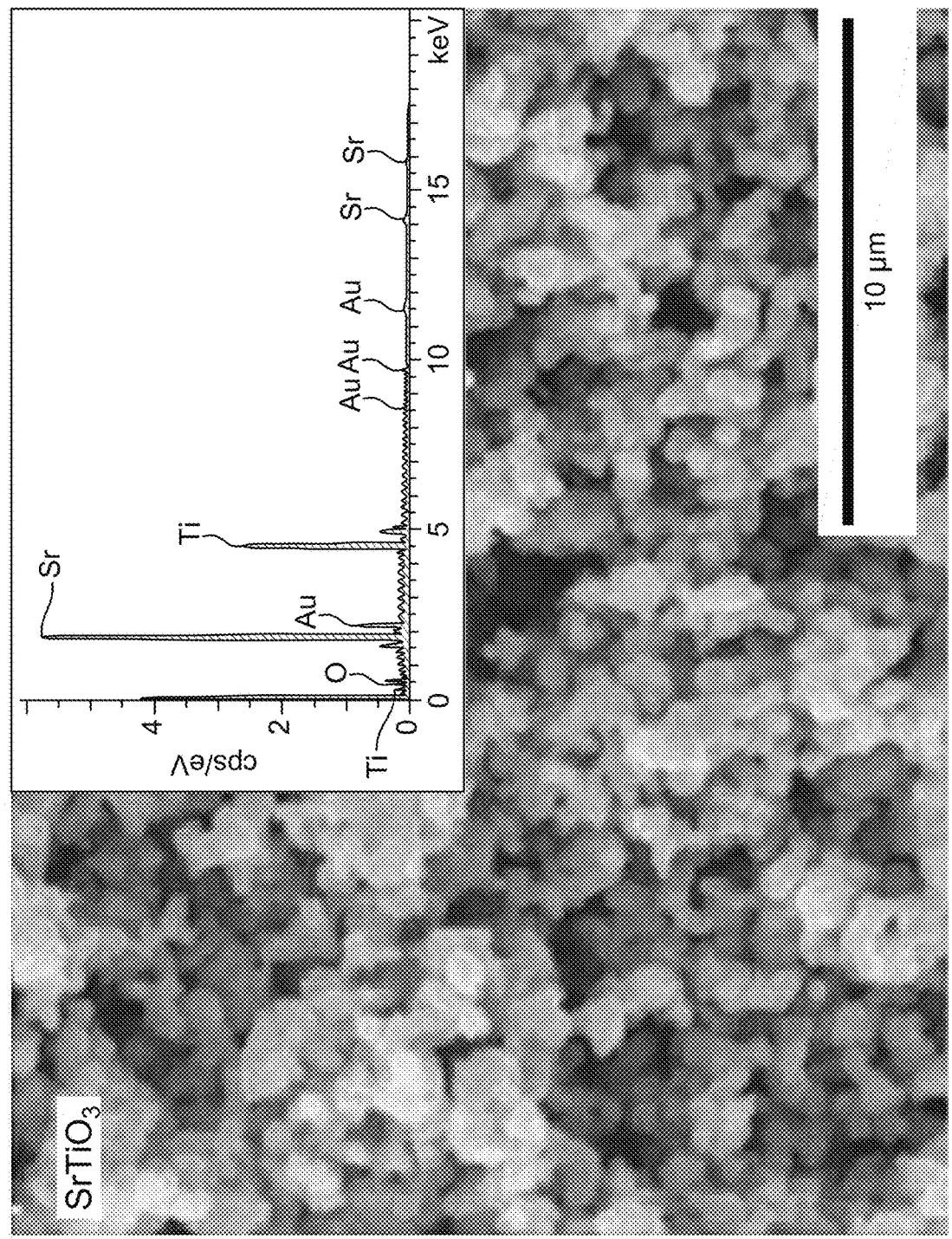
FIG. 7A depicts an EDX spectrum of SrTiO$_3$ electrode, according to certain embodiments.
Figure 7C:
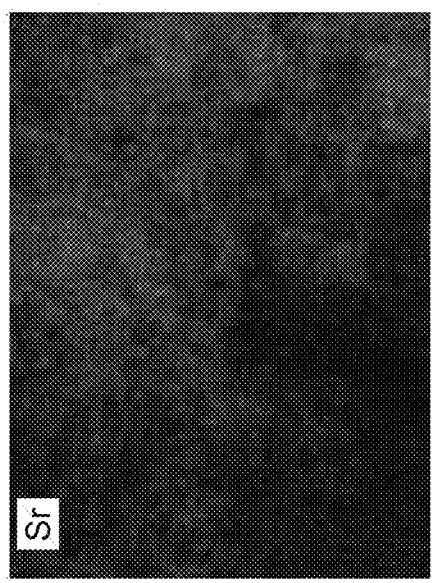
FIG. 7C depicts an elemental map of Sr in the SrTiO$_3$ electrode, according to certain embodiments.
Figure 7E:
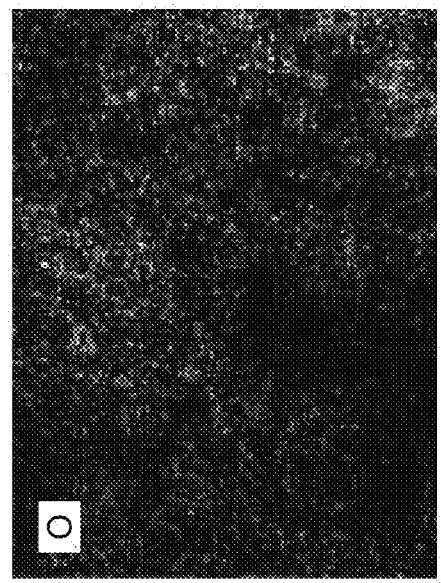
FIG. 7E depicts an elemental map of O in the SrTiO$_3$ electrode, according to certain embodiments.
Figure 7B:
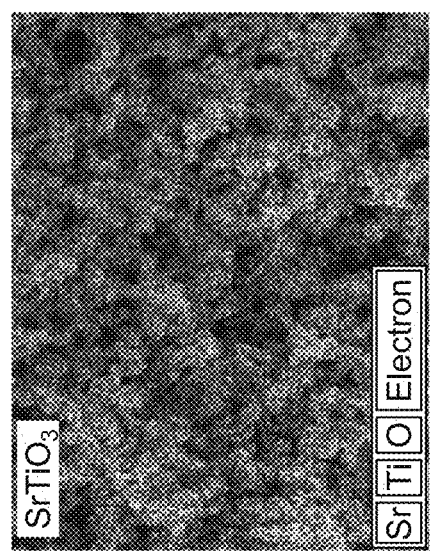
FIG. 7B depicts an elemental map of Sr, Ti, and O in the SrTiO$_3$ electrode, according to certain embodiments.
Figure 7D:
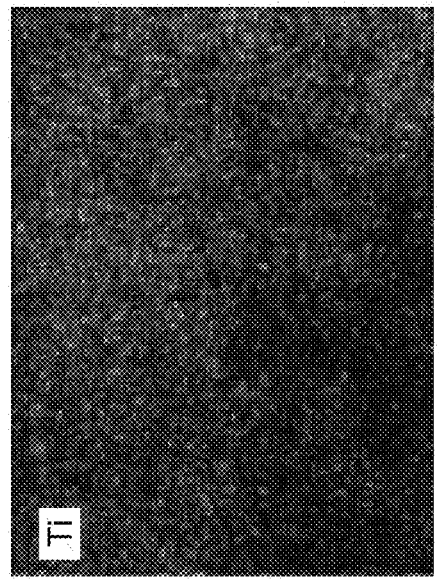
FIG. 7D depicts an elemental map of Ti in the SrTiO$_3$ electrode, according to certain embodiments.
Figure 8A:
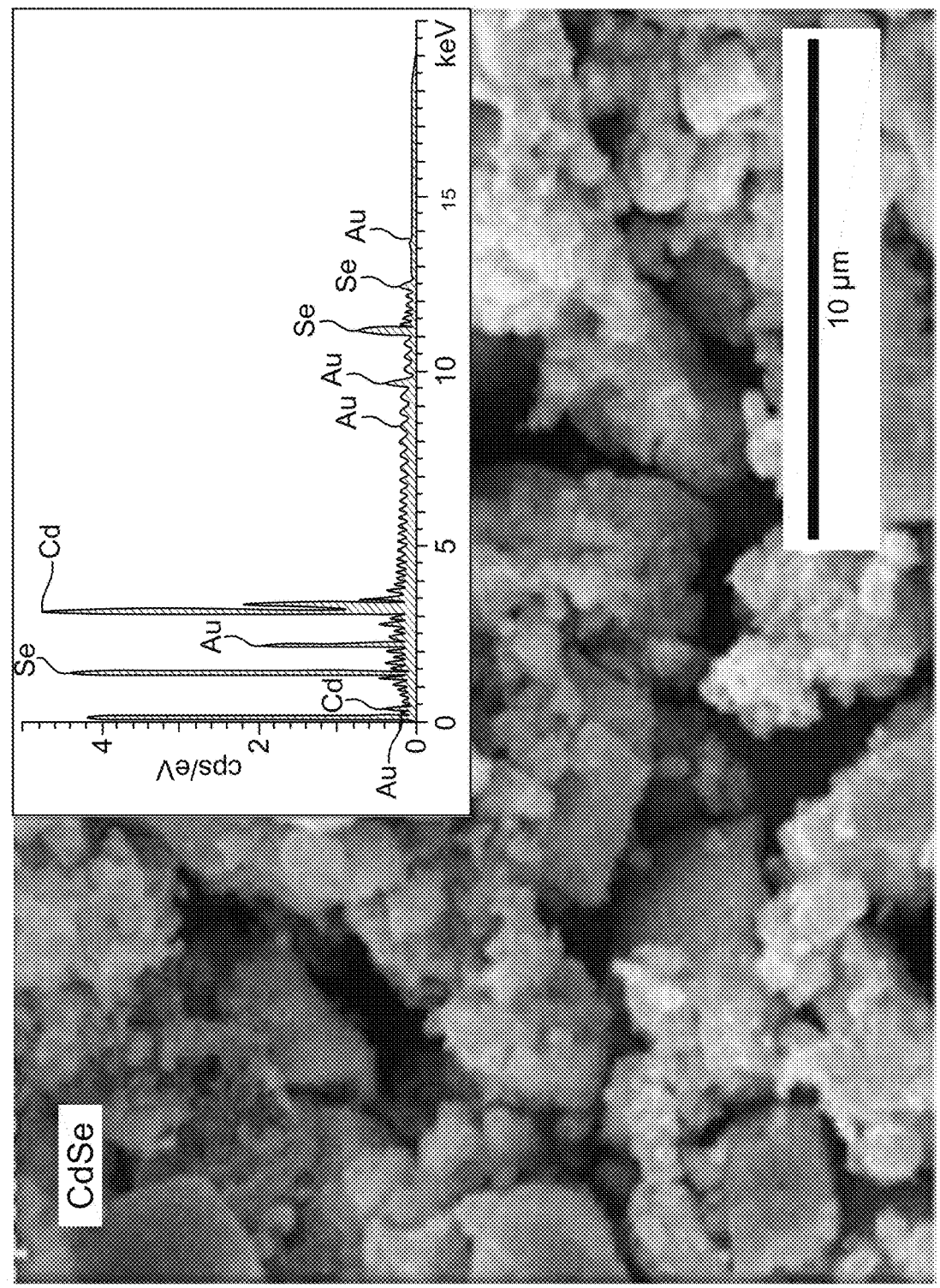
FIG. 8A depicts an EDX spectrum of the CdSe electrode, according to certain embodiments.
Figure 8B:
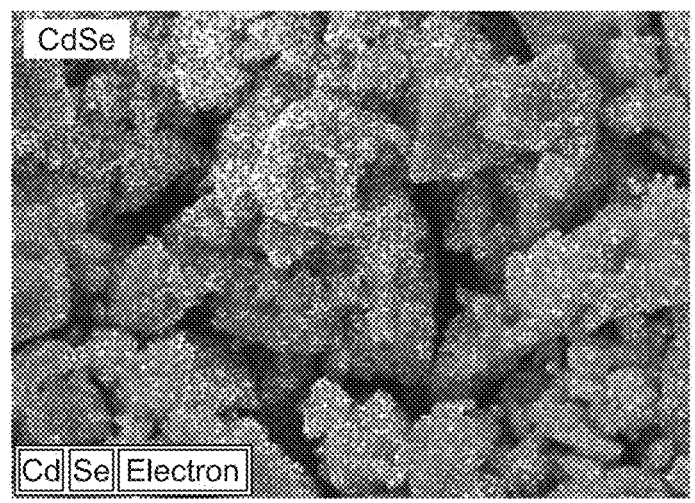
FIG. 8B depicts an elemental map of Cd, Se in the CdSe electrode, according to certain embodiments.
Figure 8C:
FIG. 8C depicts an elemental map of Cd in the CdSe electrode, according to certain embodiments.
Figure 8D:
FIG. 8D depicts an elemental map of Se in the CdSe electrode, according to certain embodiments.

SEM images of $SrTiO_3$, CdSe, and $SrTiO_3$/CdSe-3 are illustrated in FIGS. 4A-4C. It is observed that aggregated tiny spherical particles of $SrTiO_3$ (FIG. 4A) and polygon particles of CdSe (FIG. 4B) are highly organized and linked. After CdSe was incorporated into $SrTiO_3$ (FIG. 4C), the $SrTiO_3$ and CdSe retained the same shape. TEM analysis was performed to provide a complete understanding of the architecture of the $SrTiO_3$/CdSe-3 nanocomposites. The TEM images of $SrTiO_3$ (FIG. 5A), CdSe (FIG. 5B), and CdSe incorporated $SrTiO_3$ (FIG. 5C) demonstrated the same structure and consistent with the SEM micrographs. Furthermore, high-resolution transmission electron microscopy (HRTEM) image of $SrTiO_3$/CdSe-3 nanocomposites (FIG. 5D) clearly shows that $SrTiO_3$ and CdSe nanoparticles are tightly bound together. Lattice fringes with d-spacings of 0.276 nm and 0.198 nm relate to the (110) and (103) lattice planes of $SrTiO_3$ and CdSe, respectively. The elemental mapping of the $SrTiO_3$/CdSe-3 sample for Sr, Ti, O, Cd, and Se elements, as shown in FIGS. 6A-6G, reveals that CdSe is well incorporated into the $SrTiO_3$. Furthermore, the elemental concentration of the $SrTiO_3$/CdSe-3 sample for Sr, Ti, O, Cd, and Se elements is depicted in Table 1.

TABLE 1

Elemental concentration of $SrTiO_3$/CdSe-3 sample for Sr, Ti, O, Cd, and Se elements.

| Elements | Wt. % | σ |
|---|---|---|
| Sr | 43.4 | 0.8 |
| Ti | 27.2 | 0.5 |
| O | 26.8 | 1 |
| Cd | 1.8 | 0.3 |
| Se | 0.7 | 0.3 |

EDX spectrum, elemental mapping, and concentration of pristine $SrTiO_3$ and CdSe are also presented in FIGS. 7A-7E, FIGS. 8A-8D, table 2 and table 3, respectively.

TABLE 2

Elemental concentration of $SrTiO_3$ sample for Sr, Ti, and O elements.

| Elements | Wt. % | σ |
|---|---|---|
| Sr | 43.8 | 0.7 |
| O | 32.2 | 1 |
| Ti | 23.9 | 0.5 |

TABLE 3

Elemental concentration of CdSe sample for Cd and Se elements.

| Elements | Wt. % | σ |
|---|---|---|
| Cd | 62.8 | 0.6 |
| Se | 37.2 | 0.6 |

The EDX spectrum contains some peaks related to Au relating owing to the use of Au-coated grids for the analysis and no extra peaks were observed for contaminates which confirm the purity of the nanocomposite materials.

Figure 9A:
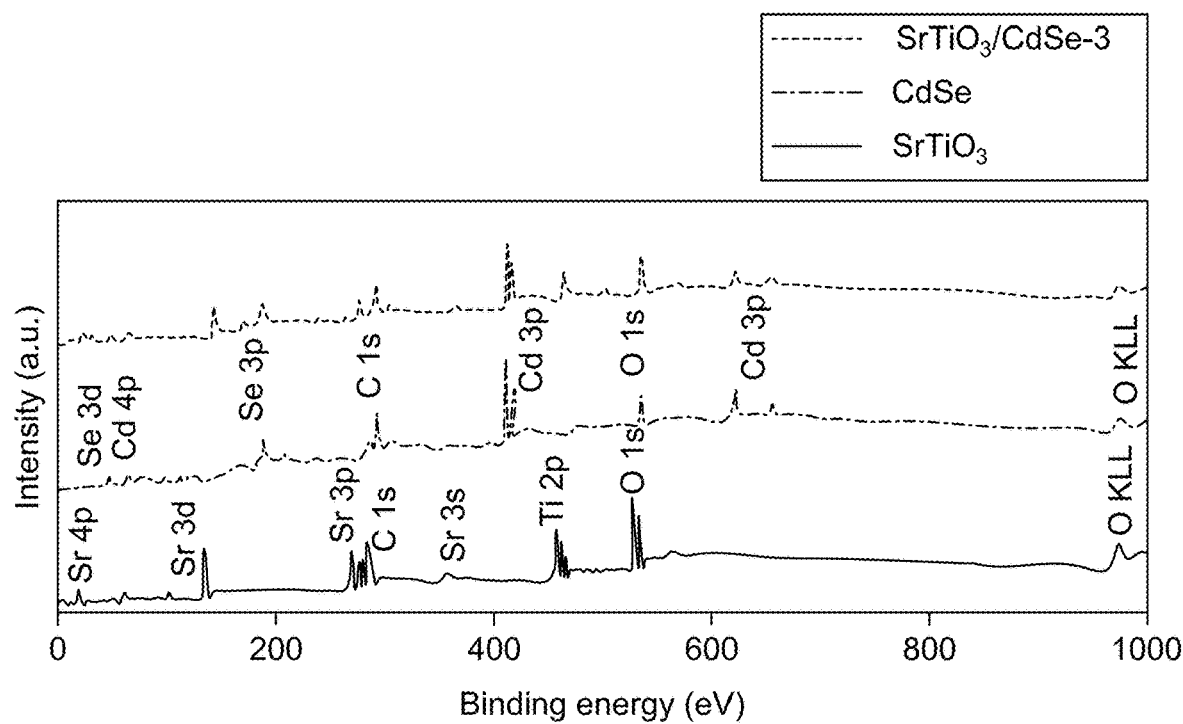
FIG. 9A depicts an X-ray photoelectron spectroscopy (XPS) survey scan of SrTiO$_3$, CdSe, and SrTiO$_3$/CdSe-3 electrodes, according to certain embodiments.
Figure 9B:
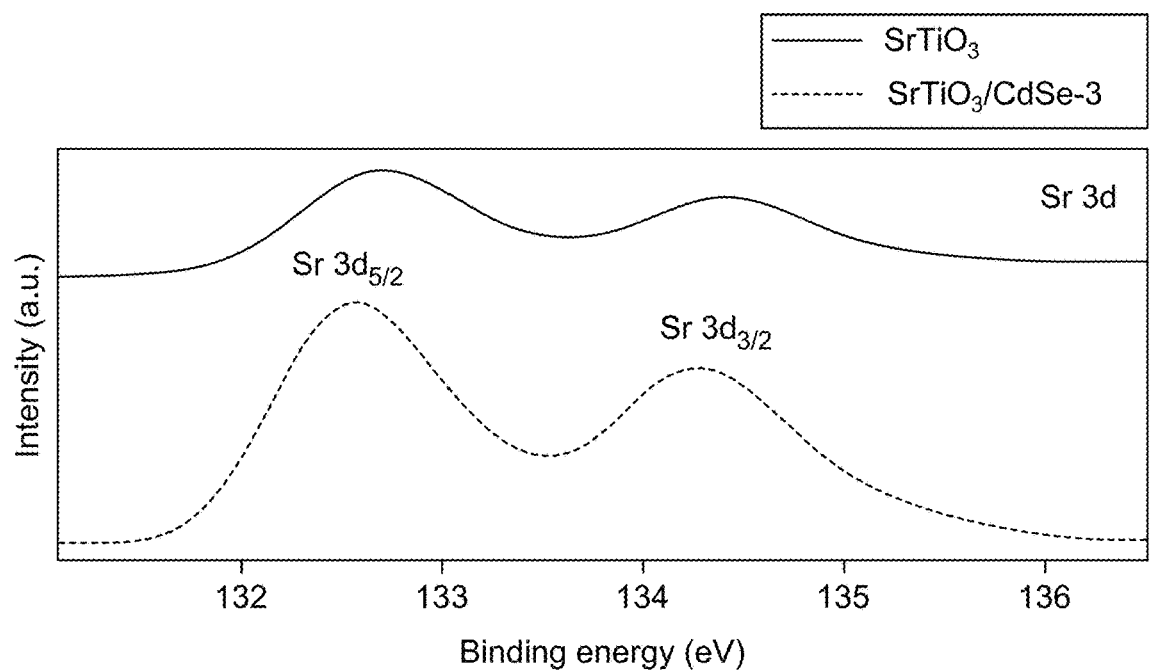
FIG. 9B depicts a core level spectrum of Sr 3d in the SrTiO$_3$/CdSe-3 electrode, according to certain embodiments.
Figure 9C:
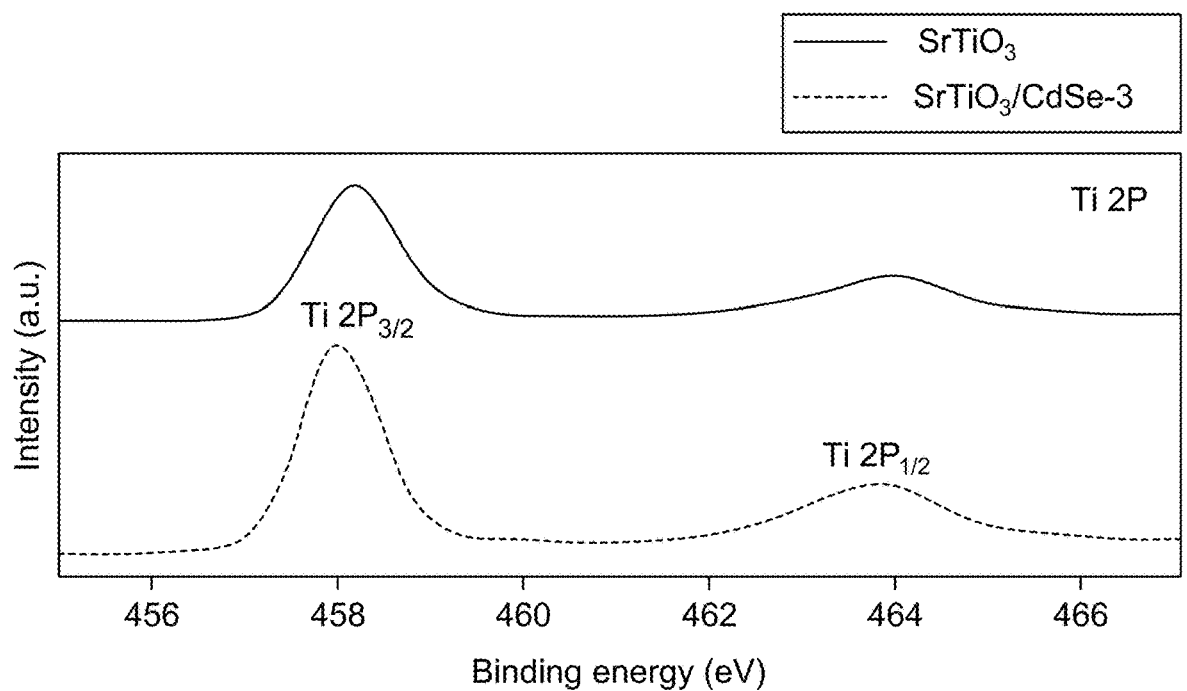
FIG. 9C depicts a core level spectrum of Ti 2p in the SrTiO$_3$/CdSe-3 electrode, according to certain embodiments.
Figure 9D:
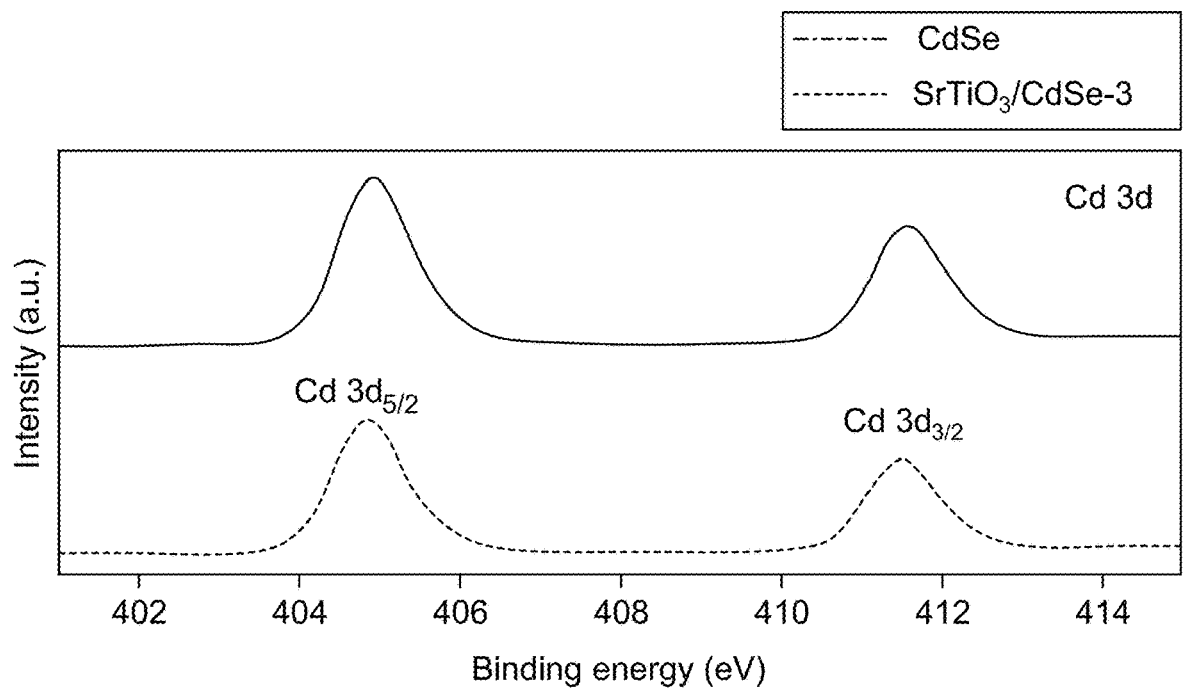
FIG. 9D depicts a core level spectrum of Cd 3d in the SrTiO$_3$/CdSe-3 electrode, according to certain embodiments.
Figure 9E:
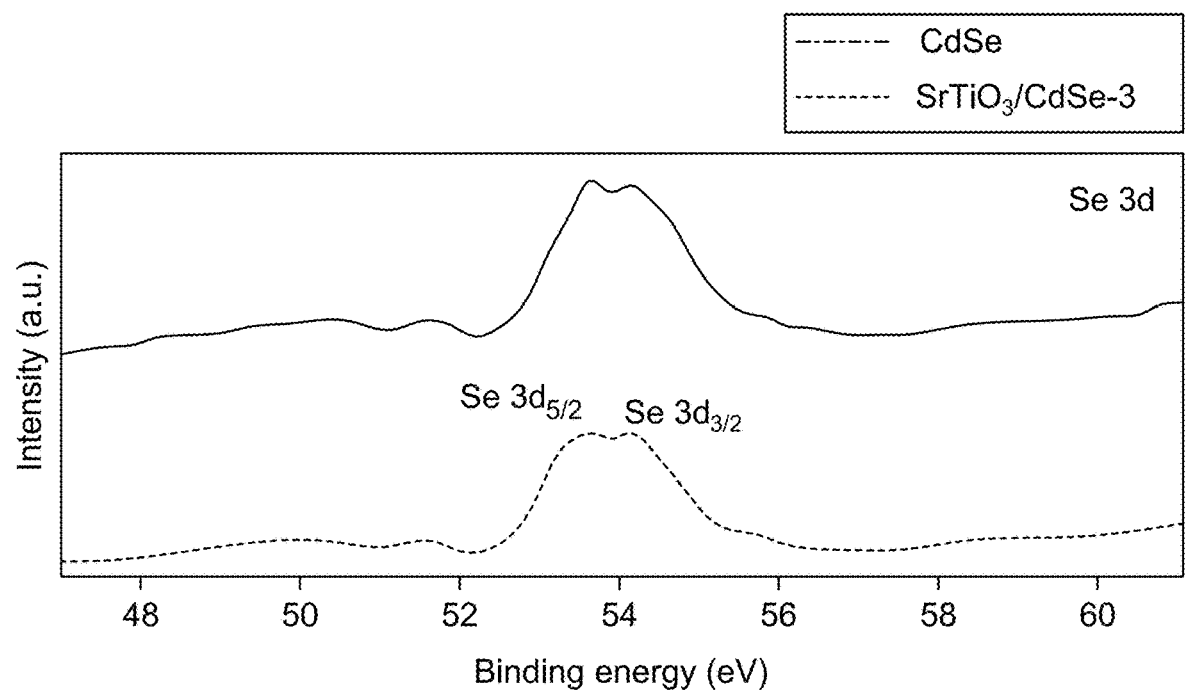
FIG. 9E depicts a core level spectrum of Se 3d in the SrTiO$_3$/CdSe-3 electrode, according to certain embodiments.
Figure 9F:
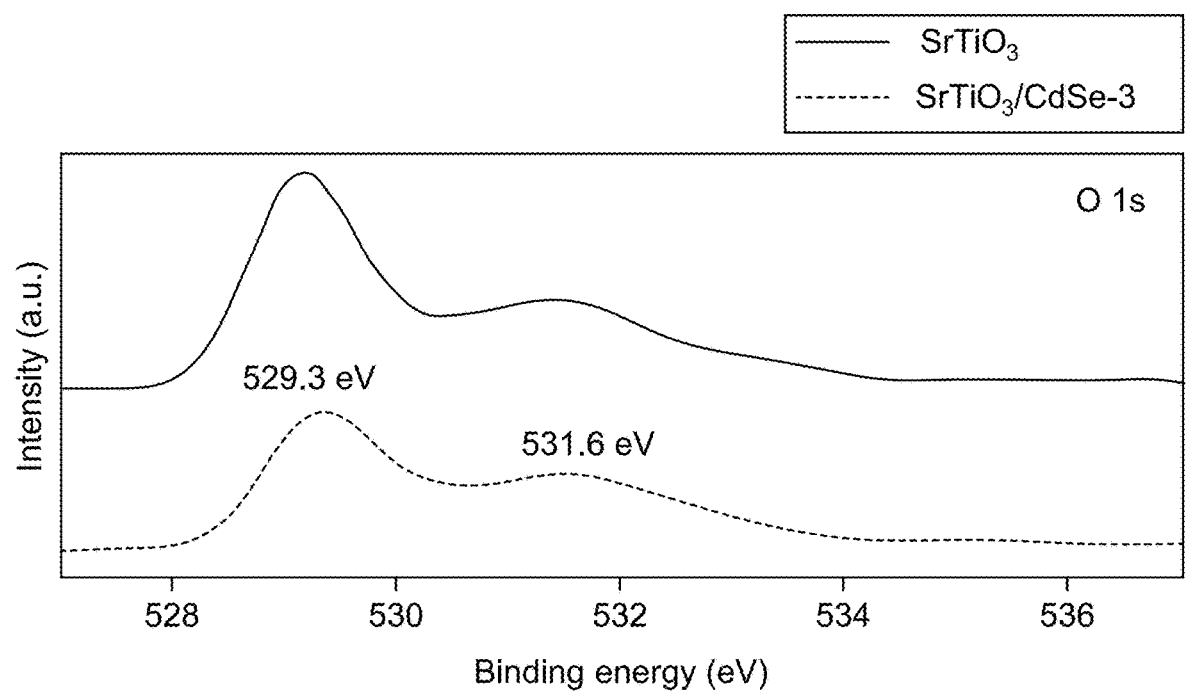
FIG. 9F depicts a core level spectrum of O 1s in the SrTiO$_3$/CdSe-3 electrode, according to certain embodiments.

The chemical states of Sr, Ti, O, Cd, and Se in $SrTiO_3$/CdSe-3 electrode was examined by using XPS to establish the presence of CdSe on $SrTiO_3$. All binding energies for the representative elements were corrected with respect to the reference C 1s peak (284.6 eV). FIG. 9A depicts elemental composition survey spectra of $SrTiO_3$, CdSe, and $SrTiO_3$/CdSe electrodes, which further confirm the presence of Sr, Ti, O, Cd, and Se peaks in the $SrTiO_3$/CdSe electrode, consistent with the EDX results. High resolution XPS spectra of Sr 3d illustrated in FIG. 9B at 132.7 electron volts (eV) and 134.4 eV correspond to the binding energies of Sr $3d_{5/2}$ and Sr $3d_{3/2}$, respectively, indicating the presence of the $Sr^{2+}$ oxidation state. The Ti 2p core level XPS spectra has two peaks at 458.1 eV and 463.9 eV binding energies, which relate to the Ti $2p_{3/2}$ and Ti $2p_{1/2}$, respectively, as shown in FIG. 9C. The separation peak among Ti $2p_{3/2}$ and Ti $2p_{1/2}$ is 5.8 eV, indicates the Ti present in $Ti^{4+}$ oxidation state. Furthermore, the Cd 3d spectrum (FIG. 9D) has two peaks at 404.7 eV and 411.5 eV that relate to the Cd $3d_{5/2}$ and Cd $3d_{3/2}$ of the $Cd^{2+}$ state of the CdSe, respectively. Two peaks at 53.5 eV and 54.1 eV in the Se 3d spectrum (FIG. 9E) depict the selenium-metal bonding structure designated to Se $3d_{5/2}$ and Se $3d_{3/2}$ of the $Se^{4+}$ state moiety in the CdSe. In case of core level O 1s spectra (FIG. 9F), the peak at 529.3 eV corresponds to the lattice oxygen of $SrTiO_3$/CdSe, whereas the distinctive peak at 531.6 eV corresponds to the chemisorbed oxygen induced by oxygen vacancies. Interestingly, the binding energies of Sr, Ti, and O in $SrTiO_3$/CdSe electrode had a positive shift as compared with that of pristine $SrTiO_3$ (FIGS. 9B, 9C, and 9F). However, XPS peaks of Cd and Se in $SrTiO_3$/CdSe electrode had a negative shift as compared to the bare CdSe (FIGS. 9D and 9E).

This indicates that $SrTiO_3$ and CdSe formed a heterostructure and that the composite is not a simple physical mixture. Therefore, the XPS result supports the co-existence of $SrTiO_3$ and CdSe in $SrTiO_3$/CdSe nanocomposites. Furthermore, to avoid any other interference factors, that leads the position shifts of XPS peaks, all the samples were characterized by the XPS in the same batch with the same equipment.

Example 6: Electrocatalytic HER Activity

Figure 10:
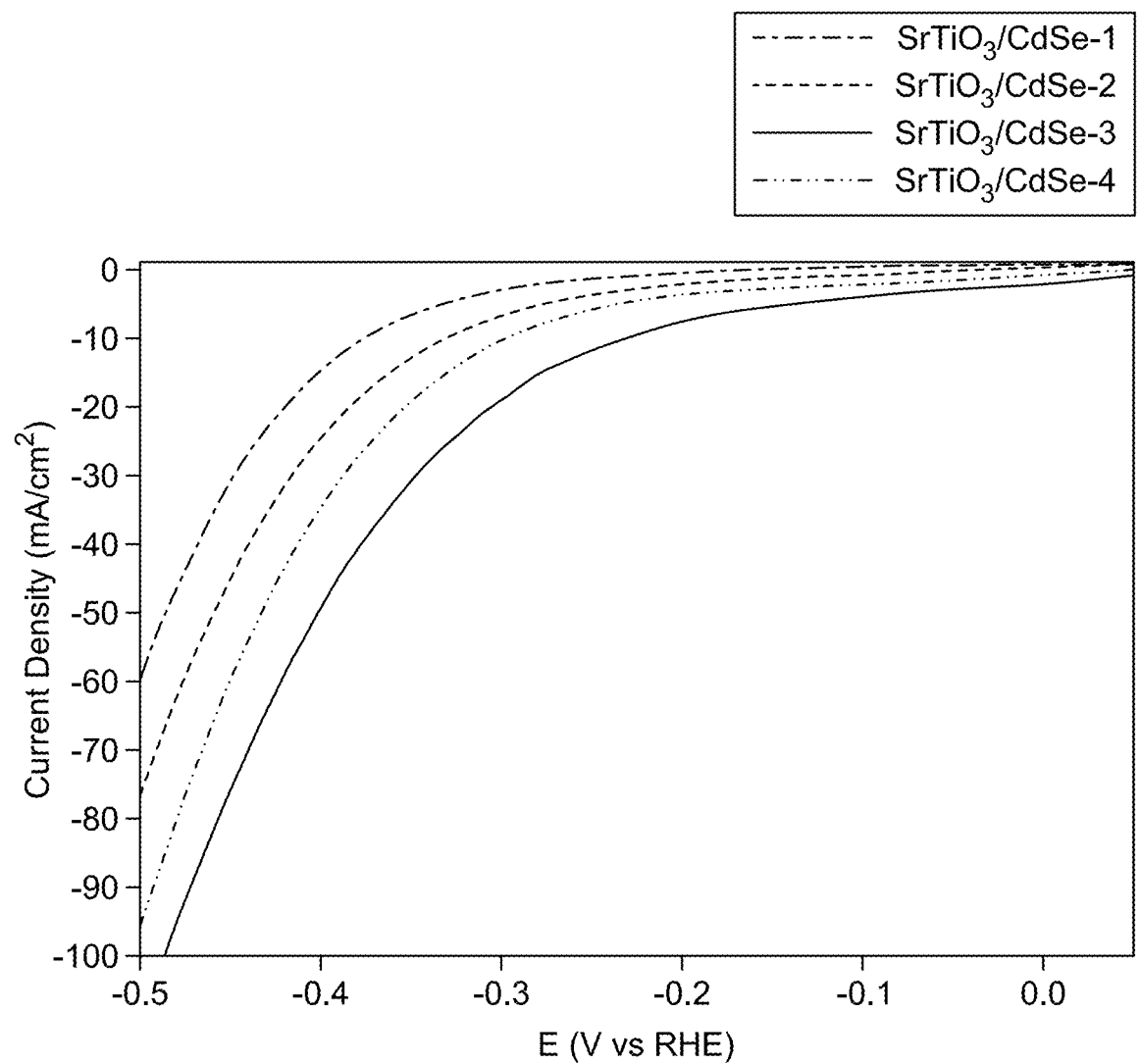
FIG. 10 depicts linear sweep voltammetry (LSV) polarization curves of SrTiO$_3$/CdSe with different wt. % of CdSe (1, 2, 3, and 4) measured in basic medium (0.1 M, KOH) at a scan rate of 10 millivolts per second (mV/s), according to certain embodiments.
Figure 11A:
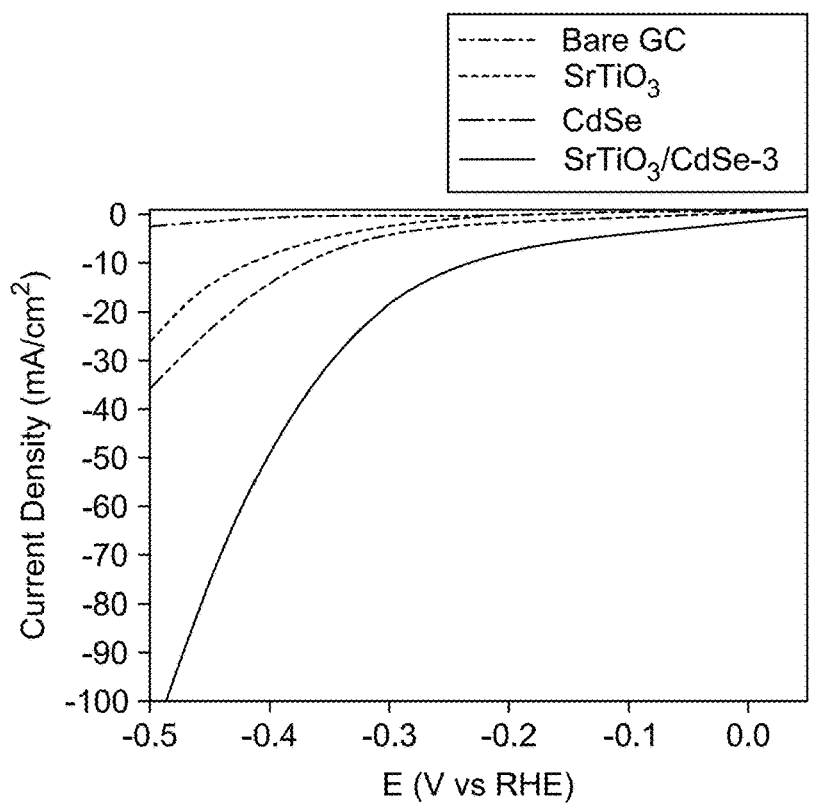
FIG. 11A depicts LSV polarization curves for SrTiO$_3$, CdSe, and SrTiO$_3$/CdSe-3 electrodes, according to certain embodiments.
Figure 11B:
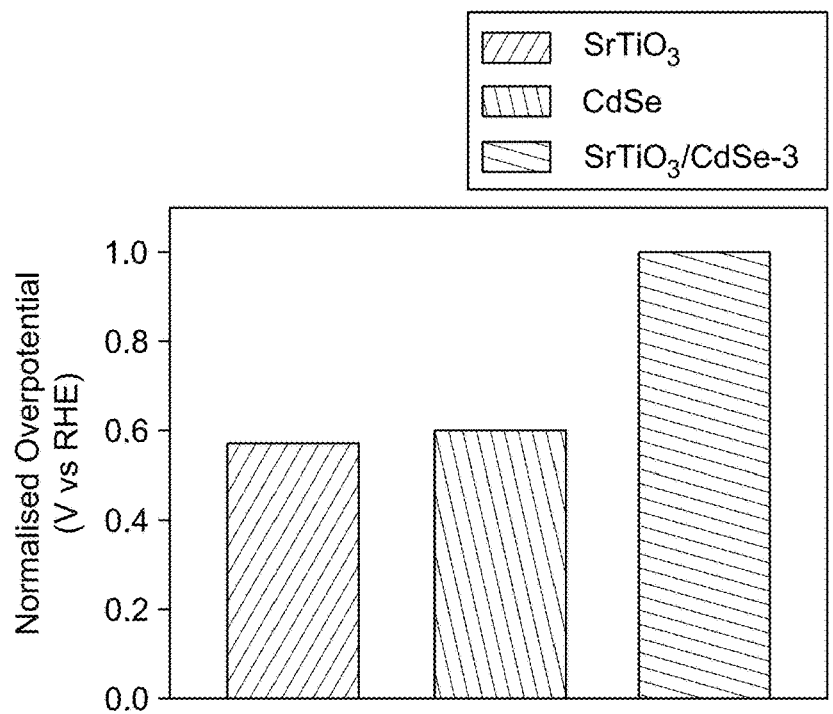
FIG. 11B depicts an overpotential histogram at a current density of −10 mA/cm$^2$ for SrTiO$_3$, CdSe, and SrTiO$_3$/CdSe-3 electrodes, according to certain embodiments.

Cathodic polarization curves (I-V) were employed in a typical three-electrode system to determine the electrocatalytic activity of the representative electrodes for hydrogen evolution reaction (HER) in an $N_2$ degassed basic medium (0.1M, KOH). The effect of CdSe on $SrTiO_3$ for HER was investigated and presented in FIG. 10. It was found that the loading of CdSe on $SrTiO_3$ had a great impact on the current, and overpotential was significantly suppressed. With increasing the CdSe amount on $SrTiO_3$, the HER activity is enhanced and reaches-10 $mA/cm^2$ at 224.2 mV in the case of $SrTiO_3$/CdSe-3. After that, the HER activity is unexpectedly decreased with an increasing amount of CdSe on SrTiO$_3$. It is due to the CdSe covering the active sides of the SrTiO$_3$ and increasing the recombination centers instead of creating more active sides for HER activity. Thus, SrTiO$_3$/CdSe-3 exhibits higher HER activity than pristine CdSe and SrTiO$_3$ nanocomposites as shown in FIG. 11A. For instance, an overpotential of −399.4, −375.9, and −224.2 mV is required for SrTiO$_3$, CdSe, and SrTiO$_3$/CdSe electrodes to exhibit current density of −10 mA/cm$^2$, respectively. FIG. 11B shows the normalized overpotential histogram of various electrodes at a current density of −10 mA/cm$^2$ for more clarity. The greater activity of SrTiO$_3$/CdSe is attributed to SrTiO$_3$'s unique features (i.e., large surface area, strong electron mobility, and good interaction with CdSe materials).

Figure 11C:
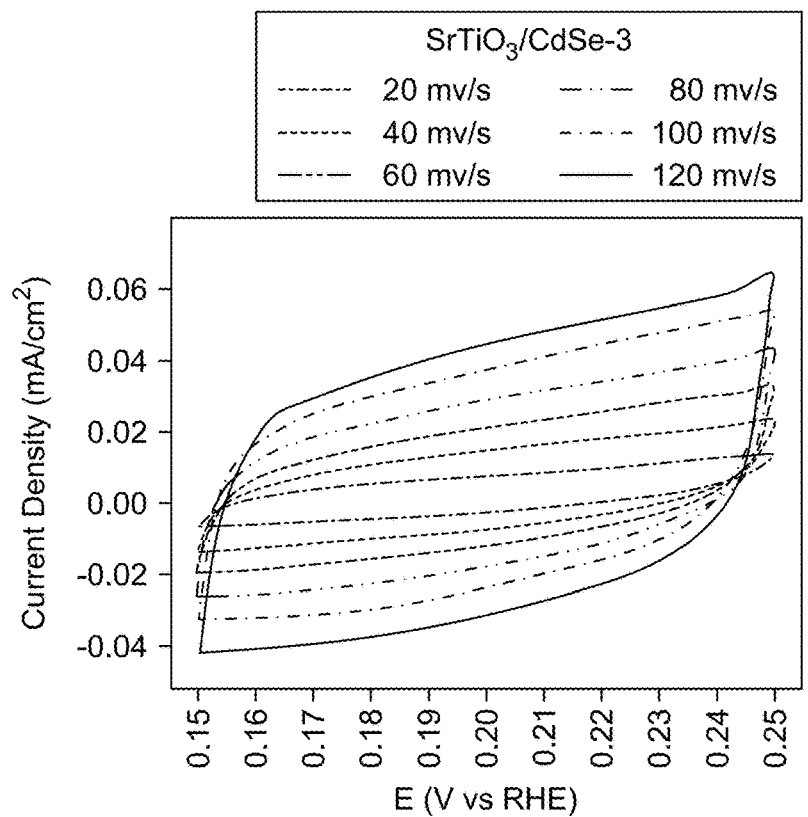
FIG. 11C depicts cyclic voltammograms (CV) of SrTiO$_3$/CdSe-3 electrode at different scan rates, according to certain embodiments.
Figure 11D:
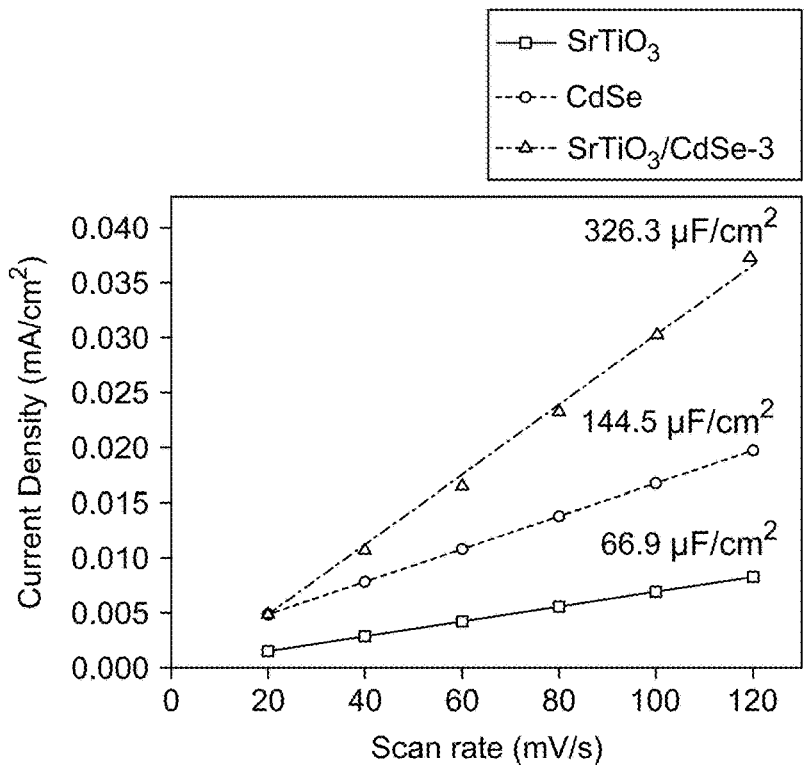
FIG. 11D depicts an electrochemically active surface area (ECSA) of pristine SrTiO$_3$, CdSe, and SrTiO$_3$/CdSe-3 electrodes, according to certain embodiments.
Figure 12:
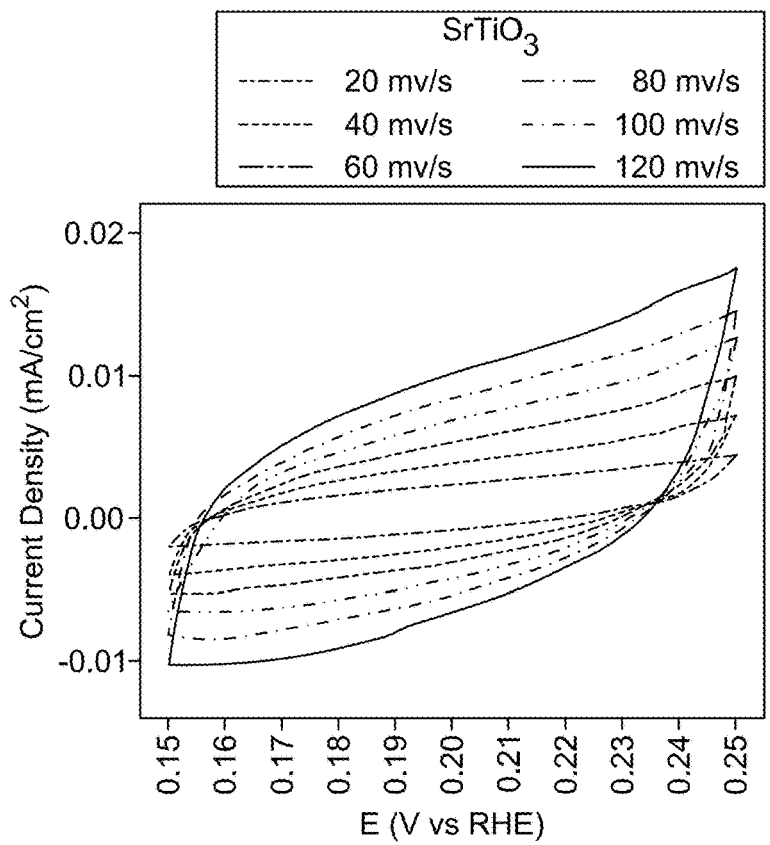
FIG. 12 depicts a CV of the SrTiO$_3$ electrode measured in basic medium (0.1 M, KOH) at different scan rates (i.e., 20, 40, 60, 80, 100, and 120 mV/s), according to certain embodiments.
Figure 13:
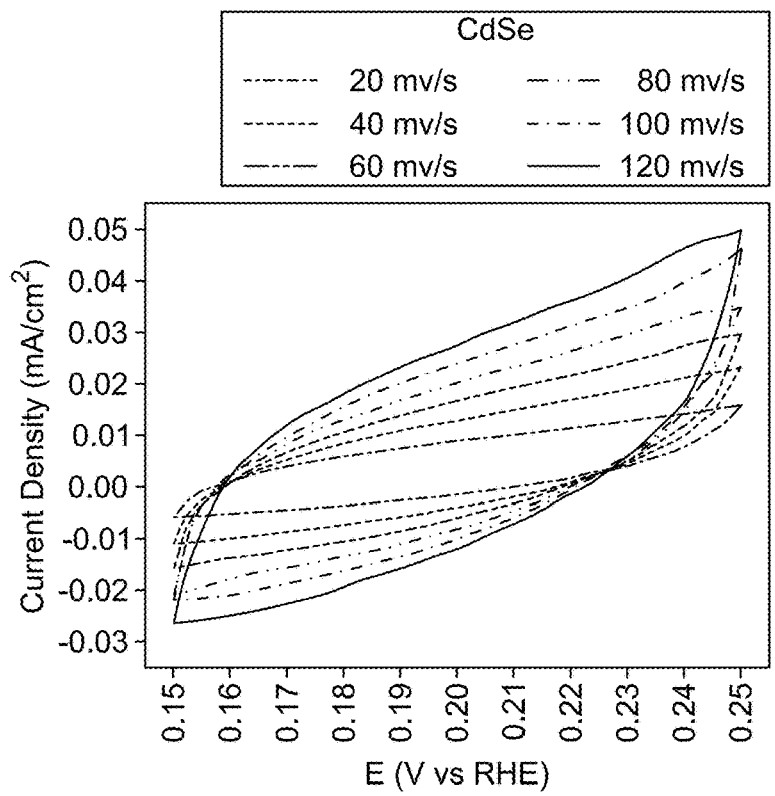
FIG. 13 depicts a CV of the CdSe electrode measured in basic medium (0.1 M, KOH) at different scan rates (i.e., 20, 40, 60, 80, 100, and 120 mV/s), according to certain embodiments.

Cyclic voltammetry (CV) of the SrTiO$_3$/CdSe-3 electrode was performed in a distinct area to confirm the high active surface area. ECSA is calculated by measuring the double-layer capacitance (DLC). The DLC is directly proportional to the ECSA, assuming that no faradic current is present in this region. FIG. 11C depicts the CVs at different scan rates (20-120 mV/s) in non-faradic regions for SrTiO$_3$/CdSe-3 electrode in KOH (0.1 M) aqueous solution. CVs for bare SrTiO$_3$ and CdSe electrodes are also presented in FIG. 12 and FIG. 13, respectively. The DLC is then calculated by the slope of linear regression fitting of the current at 0.2 (the center of the potential range of CVs vs. scan rate), as shown in FIG. 11D. It was found that the DLC of SrTiO$_3$/CdSe-3 electrode (i.e., 326.3 μF/cm$^2$) is 4.9 and 2.3-fold higher than SrTiO$_3$ (i.e., 66.9 μF/cm$^2$) and CdSe (i.e., 144.5 μF/cm$^2$) electrodes, respectively. This indicates that the CdSe modification to the SrTiO$_3$ greatly enhances the ECSA due to the direct relation between ESCA and DLC. To further confirm the ECSA of SrTiO$_3$/CdSe-3 is higher than SrTiO$_3$ and CdSe, ECSA can be calculated by the following formula, ECSA=DLC/Cs, where Cs is the specific capacitance of the material and 40 μF/cm$^2$ is reported to estimate the ECSA in KOH (0.1 M). The ECSA of SrTiO$_3$, CdSe, SrTiO$_3$/CdSe-3 are 1.7, 3.6 and 8.2, respectively. The ECSA of SrTiO$_3$/CdSe-3 is significantly enhanced after the incorporation of CdSe into SrTiO$_3$, further confirming that CdSe enhances the active sites for electrochemical HER of the SrTiO$_3$/CdSe-3 electrode.

Figure 14A:
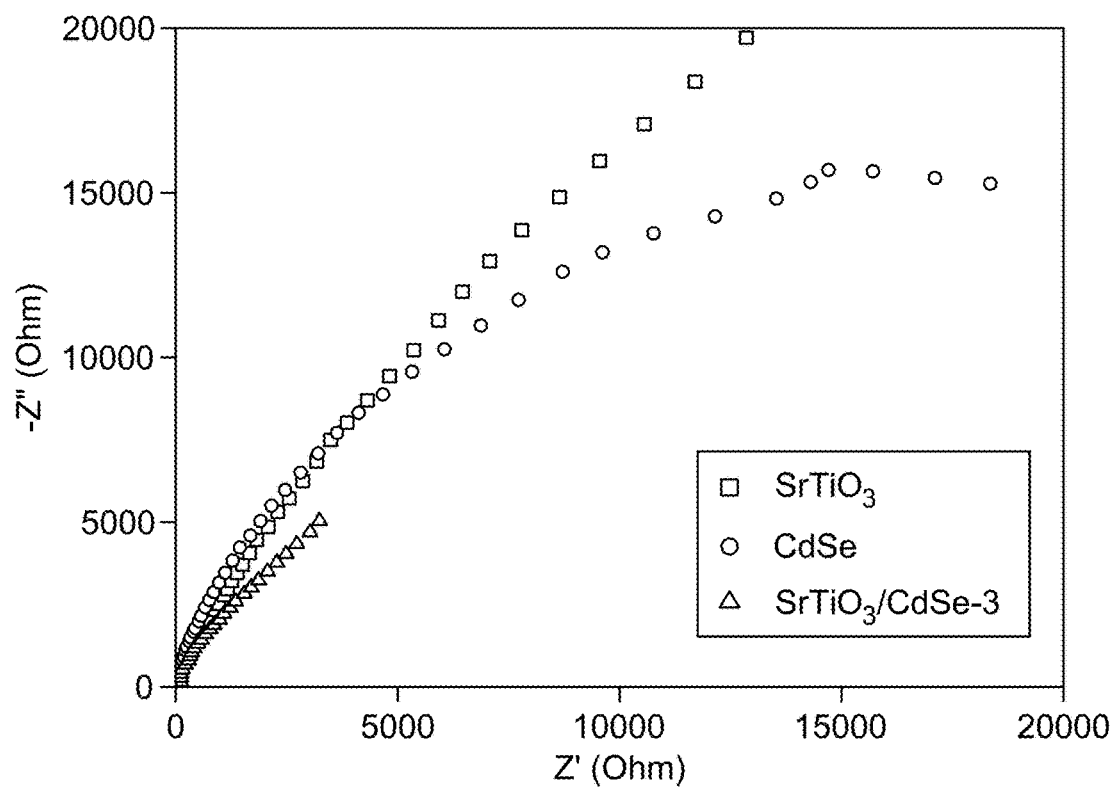
FIG. 14A depicts Nyquist plots of SrTiO$_3$, CdSe, SrTiO$_3$/CdSe-3 electrodes at an overpotential of 224.2 mV, according to certain embodiments.
Figure 14B:
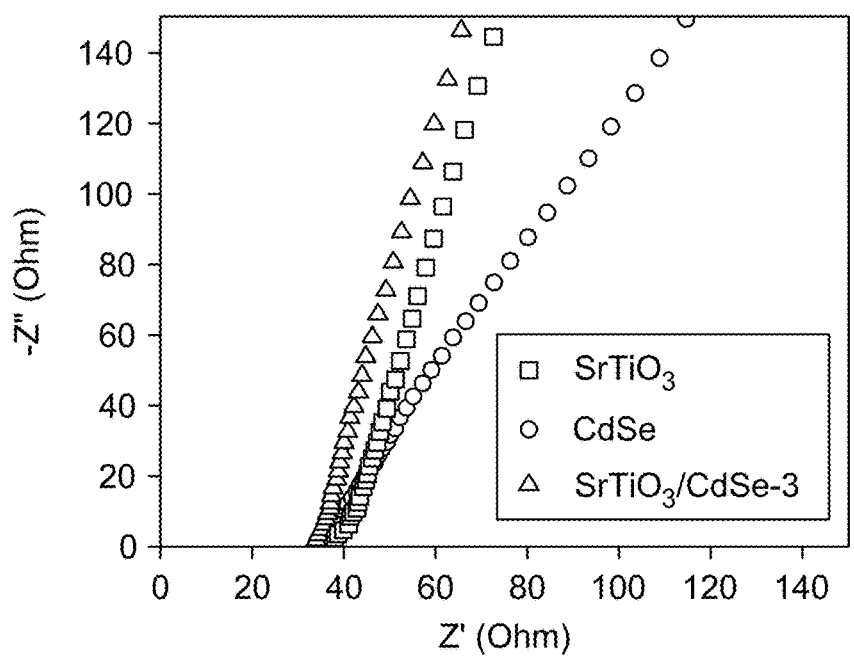
FIG. 14B depicts a zoomed graph of FIG. 14A, according to certain embodiments.

To elucidate the high HER electrocatalytic activity of the as-prepared CdSe incorporation into the SrTiO$_3$ catalyst, EIS was used to evaluate the charge transfer kinetics at the semiconductor electrolyte interface. The Nyquist plots of representative electrodes are shown in FIG. 14A and FIG. 14B in the frequency range of 0.1 to 105 Hz in KOH (0.1 M) at 224.2 mV overpotential. The small semicircle shows fast electron transfer at the catalyst/electrolyte interface, indicating strong electrocatalytic activity. As shown in FIG. 14A and FIG. 14B, SrTiO$_3$/CdSe-3 catalyst has a much lower charge transfer resistance than SrTiO$_3$ and CdSe. This indicates that the SrTiO$_3$/CdSe-3 catalyst improves HER performance by having a better ability to transfer electrons at the electrocatalysts/electrolyte interface after the incorporation of CdSe to the SrTiO$_3$ due to enhanced ECSA for HER activity, and it's consistent with the results obtained in I-V curve and DLC in FIG. 11A and FIG. 11D.

Figure 15A:
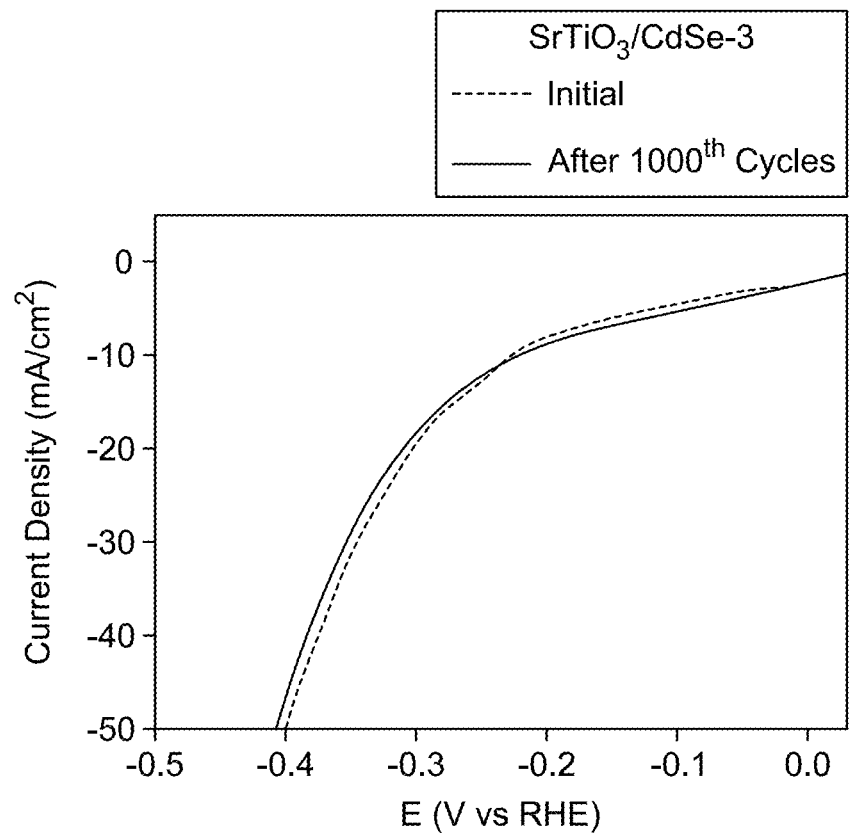
FIG. 15A depicts LSV curves of the SrTiO$_3$/CdSe-3 electrode before and after 1000 consecutive scans, according to certain embodiments.
Figure 15B:
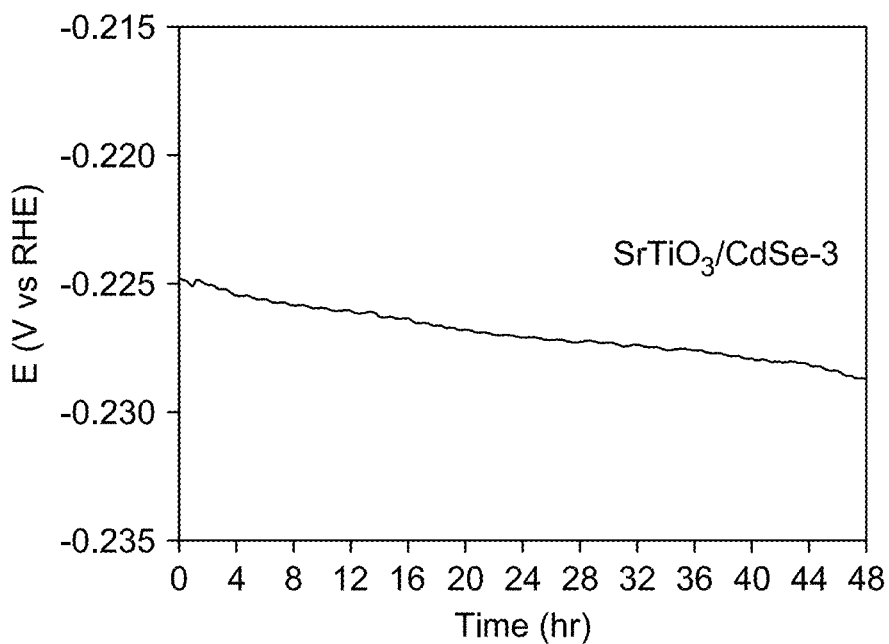
FIG. 15B depicts chronopotentiometry curve of the SrTiO$_3$/CdSe-3 electrode at the current density of −10 mA/cm$^2$, according to certain embodiments.
Figure 16:
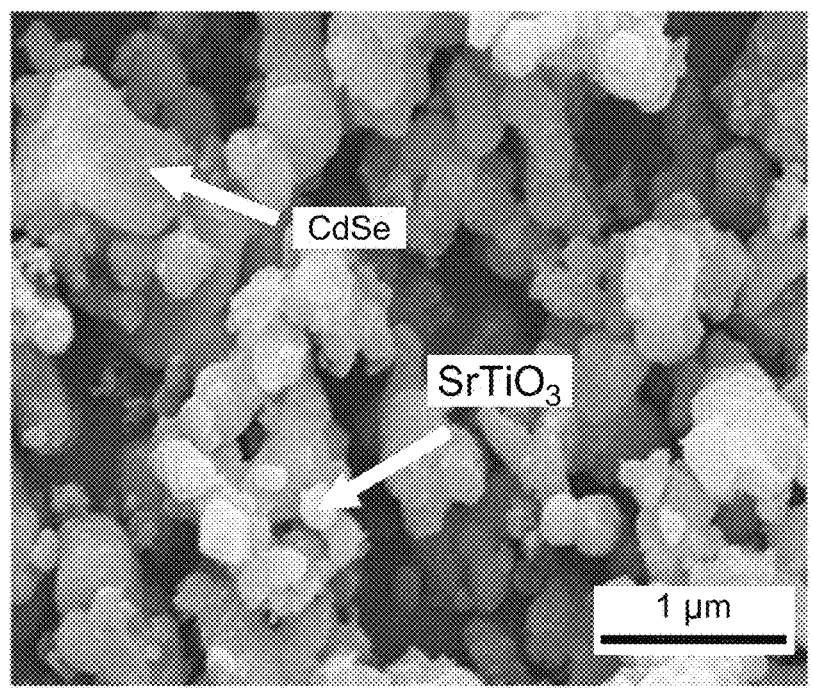
FIG. 16 depicts SEM micrographs of the SrTiO$_3$/CdSe-3 electrode after a stability test, according to certain embodiments.

The stability of CdSe-incorporated SrTiO$_3$ was examined by using 1000 successive LSV scans and chronopotentiometry as illustrated in FIG. 15A and FIG. 15B in N$_2$ degassed 0.1 M KOH aqueous solution. The SrTiO$_3$/CdSe-3 electrode exhibits almost superimposed LSV after 1000 scans, confirming the excellent stability for HER, as shown in FIG. 15A. Moreover, the stability of the SrTiO$_3$/CdSe-3 electrode was further confirmed by illustrating the exceptional long-term stability for 48 h, as shown in FIG. 15B. The potential required to obtain a current density of −10 mA/cm$^2$ was found to be constant at around 224.2 mV vs. RHE, indicating that SrTiO$_3$/CdSe-3 electrode can be practically used for electrocatalytic HER application. Furthermore, an SEM inspection of the electrocatalyst after the stability test (FIG. 16) shows that the catalyst particles are clumped together but remain almost the same, which means that the electrocatalyst is very stable in nature and consistent with the stability results in FIG. 16.

Example 7: Mechanism for PLAL Synthesis and HER

SrTiO$_3$/CdSe nanocomposite was synthesized using an advanced and clean PLAL technique with a 532 nm ND:YAG laser working at the second harmonic. The other parameters of laser setup include: (i) pulse energy of 350 millijoules (mJ), (ii) pulse width of 8 ns, and (iii) repetition rate of 10 Hz. During the PLAL process, a laser beam was focused on the SrTiO$_3$, and CdSe homogenized water dispersion for nearly 30 min using a focusing lens to convey an adequate laser fluence, as shown in FIG. 17. The experimental parameters are disclosed in M. Hassan, M. A. Gondal, E. Cevik, T. F. Qahtan, A. Bozkurt, M. A. Dastageer, high performance pliable supercapacitor fabricated using activated carbon nanospheres intercalated into boron nitride nanoplates by pulsed laser ablation technique, Arabian J. Chem. 13 (2020) 6696-6707; M. A. Gondal, A. M. Ilyas, U. Baig, Pulsed laser ablation in liquid synthesis of ZnO/TiO$_2$ nanocomposite catalyst with enhanced photovoltaic and photocatalytic performance, Ceram. Int. 42 (2016) 13151-13160, incorporated herein by reference in its entirety.

The laser beam is absorbed as soon as it contacts the solid sample surface, and the absorbed energy is quickly converted to heat. As a consequence of the heat, the metallic sample melts in the vicinity. Because of the superior irradiance of the concentrated laser pulses, the focal zone on the sample surface includes sufficient energy to induce the vaporization of a tiny region on the solid sample's surface. As a consequence of the heat generated, the laser-interrelated surface of the solid material vaporizes. The photon energy from the laser beam ionizes the vapor gas, resulting in the development of a plasma. The created plasma plume contains atoms, high-energy particles, ions, electrons, and molecules, respectively. Because of the high irradiance at the site on the metallic sample's surface, the created plasma bubble has unique properties such as high temperature and pressure. The laser-stimulated plasma bubble quickly develops to its extreme size before cooling and fracturing due to the huge pressure difference between the bubble cavity and the liquid. The energetic particles within the plasma network with the molecules of the liquid form as a consequence of the plume's unique features, resulting in the production of nanomaterials made up of atoms from the solid sample and the neighboring solution. The physical appearance of the mixture after laser ablation, especially a change in color, indicates a successful composition between SrTiO$_3$ and CdSe. The resultant mixture doesn't need any post-synthesis purification because there are no intermediary chemicals or catalysts used in the PLAL process and yielding a highly pure nanocomposite material.

Figure 18A:
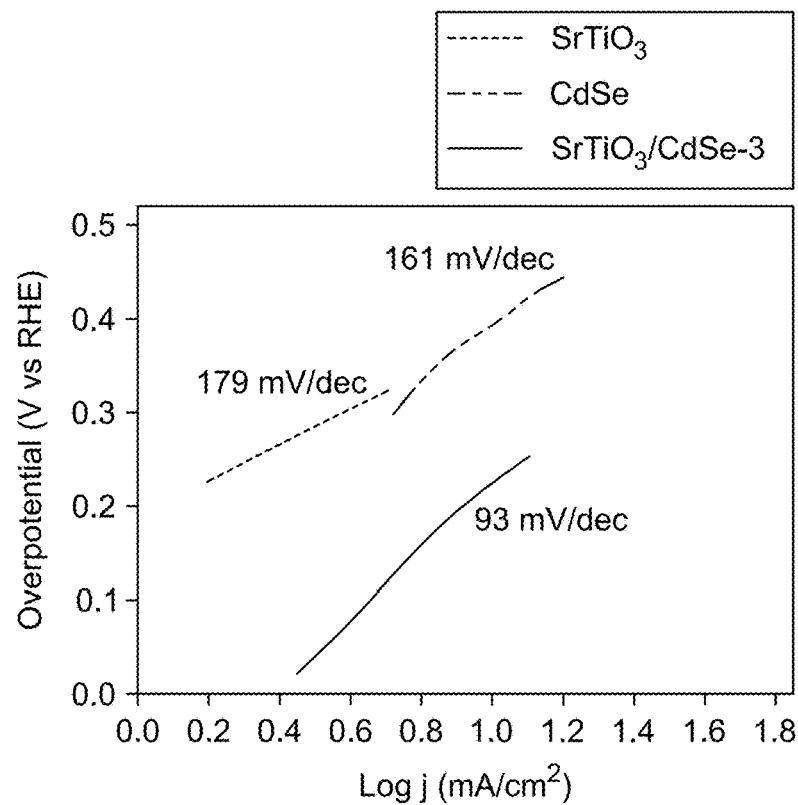
FIG. 18A depicts Tafel plots of SrTiO$_3$, CdSe, and SrTiO$_3$/CdSe-3 electrodes, according to certain embodiments.
Figure 18B:
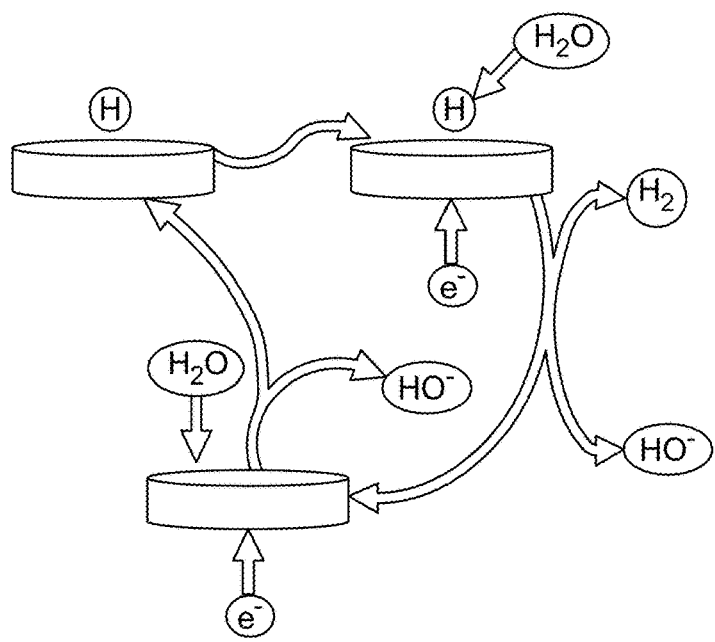
FIG. 18B depicts a proposed schematic representation of the HER mechanism for SrTiO$_3$/CdSe-3 electrodes in the basic medium, according to certain embodiments.

To further understand the HER mechanism process, the Tafel slopes of the electrocatalysts were assessed from the recorded LSV curves using the Tafel equation: η=a+b×log (j), where a is the Tafel constant, b is the Tafel slope, j is the current density, and η is the overpotential. SrTiO$_3$, CdSe, and SrTiO$_3$/CdSe-3 electrocatalysts had Tafel slopes (FIG. 18A) of 179, 161, and 93 millivolts per decade (mV/dec), respectively. The lower Tafel slope observed for SrTiO$_3$/CdSe-3 electrocatalyst as compared to pristine SrTiO$_3$, and CdSe electrocatalyst, demonstrates that the incorporation CdSe in SrTiO$_3$ improves HER electrocatalytic activity and charge transfer at the electrocatalysts/electrolyte interface. The HER mechanism and rate-determining steps have been extensively studied using the Tafel slope. The Volmer, Heyrovsky, and Tafel steps are the three popular steps for converting hydrogen proton into molecular hydrogen. According to these mechanism processes, the combination of the Volmer step with either the Heyrovsky step or the Tafel step results in the formation of molecular hydrogen. In most cases, the Volmer step mechanism is the rate-determining step if the slope is around 120 mV/dec. While the rate-determining step is the Heyrovsky or Tafel step mechanism if the slope is around 40 or 30 mV/dec, respectively. The Tafel slopes for SrTiO$_3$/CdSe-3 electrocatalyst was found to be 93 mv/dec, demonstrating that the rate-determining step is most likely the Volmer-Heyrovsky step mechanism, respectively. A proposed schematic representation of HER Volmer-Heyrovsky step mechanism in the basic medium, as shown in FIG. 18B.

Numerous modifications and variations of the present disclosure are possible in light of the above teachings. It is therefore to be understood that within the scope of the appended claims, the invention may be practiced otherwise than as specifically described herein.

The invention claimed is:

1. A method of generating hydrogen gas, comprising:
    applying a potential of greater than 0 to 1.0 volts (V) to an electrochemical cell,
    wherein the electrochemical cell is at least partially submerged in an aqueous solution,
    wherein on applying the potential the aqueous solution is reduced thereby forming hydrogen gas,
    wherein the electrochemical cell comprises:
    an electrocatalyst; and
    a counter electrode;
    wherein the electrocatalyst comprises:
    a substrate;
    strontium titanate (SrTiO$_3$) nanoparticles; and
    cadmium selenide (CdSe) nanoparticles,
    wherein the SrTiO$_3$ nanoparticles have a substantially spherical shape,
    wherein the CdSe nanoparticles have a polygon shape,
    wherein the CdSe nanoparticles are distributed within a network of the SrTiO$_3$ nanoparticles on a surface of the substrate; and
    wherein forming the electrocatalyst further comprises:
    sonicating a solution of SrTiO$_3$ and CdSe to form a homogeneous solution;
    irradiating the homogeneous solution with a pulsed laser for at least 10 minutes to form the CdSe nanoparticles and the SrTiO$_3$ nanoparticles in a suspension;
    drying the suspension at a temperature of at least 80° C. for at least 30 minutes and
    coating it on the substrate to form the electrocatalyst.

2. The method of claim 1, wherein the SrTiO$_3$ nanoparticles have an average diameter of 50-150 nanometers (nm).

3. The method of claim 1, wherein the CdSe nanoparticles have an average size of 500 nm to 5 micrometers (μm).

4. The method of claim 1, wherein the CdSe nanoparticles and the SrTiO$_3$ nanoparticles form a heterostructure.

5. The method of claim 1, wherein the electrocatalyst comprises 0.1-10 wt. % CdSe nanoparticles relative to a total weight of the CdSe nanoparticles and the SrTiO$_3$ nanoparticles.

6. The method of claim 1, wherein the electrocatalyst comprises 80-99.9 wt. % SrTiO$_3$ nanoparticles relative to a total weight of the CdSe nanoparticles and the SrTiO$_3$ nanoparticles.

7. The method of claim 1, wherein the electrocatalyst comprises 35-55 wt. % Sr, 20-30 wt. % Ti, 20-30 wt. % O, 0.1-5.0 wt. % Cd, and 0.01-2 wt. % Se, based on a total weight of the CdSe nanoparticles and the SrTiO$_3$ nanoparticles.

8. The method of claim 1, wherein the pulsed laser has a wavelength of 500-550 nm.

9. The method of claim 1, wherein the pulsed laser has a pulse duration of 5-10 nanoseconds (ns).

10. The method of claim 1, wherein the aqueous solution comprises at least one base selected from the group consisting of an alkaline earth metal hydroxide and an alkali metal hydroxide.

11. The method of claim 10, wherein the base is potassium hydroxide.

12. The method of claim 1, wherein the substrate is made from a material selected from the group consisting of platinum, gold, and carbon.

13. The method of claim 1, wherein the electrocatalyst has an overpotential of 200-250 millivolts (mV) for a current density of 10 milliampere per square centimeter (mA cm$^{-2}$).

14. The method of claim 13, wherein the overpotential does not vary by more than 5% after the potential is applied for 2-50 hours.

15. The method of claim 1, wherein the electrocatalyst has a double layer capacitance of 300-350 microfarads per square centimeter (μF cm$^{-2}$).

16. The method of claim 1, wherein the electrocatalyst has a double layer capacitance at least 2 times larger than a same electrocatalyst having only one of the CdSe nanoparticles and the SrTiO$_3$ nanoparticles.

17. The method of claim 1, wherein the electrocatalyst does not include a cocatalyst.

18. The method of claim 1, wherein the electrocatalyst consists of the CdSe nanoparticles, the SrTiO$_3$ nanoparticles, and the substrate,
    wherein the substrate is made of carbon.

* * * * *